(12) United States Patent
Yokota

(10) Patent No.: US 9,049,690 B2
(45) Date of Patent: Jun. 2, 2015

(54) COMMUNICATION SYSTEM, WIRELESS COMMUNICATION TERMINAL, COMMUNICATION METHOD, WIRELESS COMMUNICATION METHOD, WIRELESS COMMUNICATION APPARATUS AND CONTROL METHOD THEREOF

(75) Inventor: Tomoyoshi Yokota, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 1046 days.

(21) Appl. No.: 12/521,532

(22) PCT Filed: Dec. 26, 2007

(86) PCT No.: PCT/JP2007/075034
§ 371 (c)(1),
(2), (4) Date: Oct. 28, 2010

(87) PCT Pub. No.: WO2008/078798
PCT Pub. Date: Jul. 3, 2008

(65) Prior Publication Data
US 2011/0044210 A1 Feb. 24, 2011

(30) Foreign Application Priority Data

Dec. 27, 2006 (JP) .................................. 2006-353156
Dec. 27, 2006 (JP) .................................. 2006-353279
Jan. 30, 2007 (JP) .................................. 2007-019624

(51) Int. Cl.
*H04L 29/06* (2006.01)
*H04W 76/02* (2009.01)
*H04W 80/10* (2009.01)

(52) U.S. Cl.
CPC ........... *H04W 76/02* (2013.01); *H04L 65/1006* (2013.01); *H04W 80/10* (2013.01); *H04L 65/1069* (2013.01)

(58) Field of Classification Search
CPC .................................................. H04L 65/1006
USPC .................. 370/259, 323, 328, 331, 352, 461
See application file for complete search history.

(56) References Cited

U.S. PATENT DOCUMENTS 5,341,478 A * 8/1994 Travis et al. .................. 709/203
5,535,195 A * 7/1996 Lee ............................... 370/256

(Continued)

FOREIGN PATENT DOCUMENTS

JP 2001-358834 12/2001
JP 2005-229583 8/2005

(Continued)

OTHER PUBLICATIONS

J. Rosenburg et al., "SIP: Session Initiation Protocol" http://www.ietf.org/rfc/rfc3261.txt, Jun. 2002.

(Continued)

*Primary Examiner* — Andrew Lai
*Assistant Examiner* — Andrew C Lee
(74) *Attorney, Agent, or Firm* — Studebaker & Brackett PC

(57) ABSTRACT

A communication system includes a call control server that receives a call request containing preference information of the outgoing call side, calls the incoming call side and transmits call request reception information containing information indicating that the call request has been received and the preference information to a message transmission server in order to convey the received call request to the incoming call side. The message transmission server receives the call request reception information transmitted from the call control server and transmits an activation message for activating communication with the outgoing call side containing the preference information contained in the call request reception information, based on the received call request reception information, to the incoming call side.

14 Claims, 33 Drawing Sheets

(56) References Cited

U.S. PATENT DOCUMENTS

| | | | | |
|---|---|---|---|---|
| 6,424,841 B1* | 7/2002 | Gustafsson | | 455/466 |
| 6,678,264 B1* | 1/2004 | Gibson | | 370/352 |
| 6,697,352 B1* | 2/2004 | Ludwig et al. | | 370/349 |
| 6,798,768 B1* | 9/2004 | Gallick et al. | | 370/352 |
| 6,822,945 B2* | 11/2004 | Petrovykh | | 370/270 |
| 6,826,173 B1* | 11/2004 | Kung et al. | | 370/352 |
| 6,885,658 B1* | 4/2005 | Ress et al. | | 370/352 |
| 6,898,436 B2* | 5/2005 | Crockett et al. | | 455/518 |
| 6,910,074 B1* | 6/2005 | Amin et al. | | 709/227 |
| 6,973,308 B1* | 12/2005 | Smith | | 455/436 |
| 7,054,866 B2 | 5/2006 | Trivedi | | 1/1 |
| 7,269,655 B2* | 9/2007 | Kim | | 709/228 |
| 7,330,470 B2* | 2/2008 | Nakazawa et al. | | 370/392 |
| 7,471,655 B2* | 12/2008 | Gallagher et al. | | 370/329 |
| 7,623,447 B1* | 11/2009 | Faccin et al. | | 370/230 |
| 7,697,511 B2* | 4/2010 | Milstein et al. | | 370/352 |
| 7,769,146 B1* | 8/2010 | Weaver et al. | | 379/88.17 |
| 7,797,006 B2* | 9/2010 | Sung et al. | | 455/518 |
| 7,808,961 B2* | 10/2010 | Ishii et al. | | 370/338 |
| 7,889,716 B2* | 2/2011 | Tejani et al. | | 370/352 |
| 7,920,547 B2* | 4/2011 | Lim | | 370/352 |
| 7,920,549 B2* | 4/2011 | Alt et al. | | 370/352 |
| 8,064,342 B2* | 11/2011 | Badger | | 370/230 |
| 8,165,022 B2* | 4/2012 | Toyokawa et al. | | 370/230 |
| 8,166,129 B2* | 4/2012 | Gourraud | | 709/217 |
| 8,180,881 B2* | 5/2012 | Seo et al. | | 709/224 |
| 8,199,727 B1* | 6/2012 | Bienn et al. | | 370/335 |
| 8,472,430 B2* | 6/2013 | Milstein et al. | | 370/352 |
| 2002/0019241 A1* | 2/2002 | Vialen et al. | | 455/458 |
| 2002/0072363 A1* | 6/2002 | Riihinen et al. | | 455/432 |
| 2002/0141393 A1* | 10/2002 | Eriksson et al. | | 370/352 |
| 2002/0141404 A1* | 10/2002 | Wengrovitz | | 370/389 |
| 2002/0187777 A1* | 12/2002 | Osterhout et al. | | 455/417 |
| 2004/0022237 A1* | 2/2004 | Elliott et al. | | 370/356 |
| 2004/0082352 A1* | 4/2004 | Keating et al. | | 455/519 |
| 2004/0151136 A1* | 8/2004 | Gage | | 370/328 |
| 2004/0156394 A1* | 8/2004 | Westman | | 370/471 |
| 2004/0192221 A1* | 9/2004 | Matsunaga | | 455/76 |
| 2004/0248600 A1* | 12/2004 | Kim | | 455/466 |
| 2005/0003836 A1* | 1/2005 | Inoue et al. | | 455/458 |
| 2005/0083907 A1* | 4/2005 | Fishler | | 370/352 |
| 2005/0186979 A1* | 8/2005 | McCann et al. | | 455/466 |
| 2005/0220039 A1* | 10/2005 | Hoshino et al. | | 370/261 |
| 2005/0266842 A1* | 12/2005 | Nasielski et al. | | 455/432.1 |
| 2006/0015576 A1* | 1/2006 | Seo et al. | | 709/219 |
| 2006/0036642 A1* | 2/2006 | Horvitz et al. | | 707/102 |
| 2006/0246934 A1* | 11/2006 | Patel et al. | | 455/519 |
| 2006/0282408 A1* | 12/2006 | Wisely et al. | | 707/3 |
| 2006/0291450 A1* | 12/2006 | Ramachandran et al. | | 370/352 |
| 2007/0019658 A1* | 1/2007 | Park et al. | | 370/410 |
| 2007/0022289 A1* | 1/2007 | Alt et al. | | 713/168 |
| 2007/0106801 A1* | 5/2007 | Jansson | | 709/227 |
| 2007/0115847 A1* | 5/2007 | Strutt et al. | | 370/252 |
| 2007/0147240 A1* | 6/2007 | Benveniste | | 370/230 |
| 2007/0206735 A1* | 9/2007 | Silver et al. | | 379/88.19 |
| 2007/0253435 A1* | 11/2007 | Keller et al. | | 370/401 |
| 2007/0281717 A1* | 12/2007 | Bharadwaj | | 455/466 |
| 2008/0002667 A1* | 1/2008 | Smith et al. | | 370/352 |
| 2008/0005011 A1* | 1/2008 | Meek et al. | | 705/37 |
| 2008/0056234 A1* | 3/2008 | Sprague | | 370/352 |
| 2008/0155310 A1* | 6/2008 | Langen et al. | | 714/6 |
| 2009/0279451 A1* | 11/2009 | Toyokawa et al. | | 370/254 |

FOREIGN PATENT DOCUMENTS

| | | |
|---|---|---|
| JP | 2006-186855 | 7/2006 |
| JP | 2006-311147 | 11/2006 |

OTHER PUBLICATIONS

Japanese language office action dated May 22, 2012 and its English translation issued in corresponding Japanese application 2008551147.

* cited by examiner

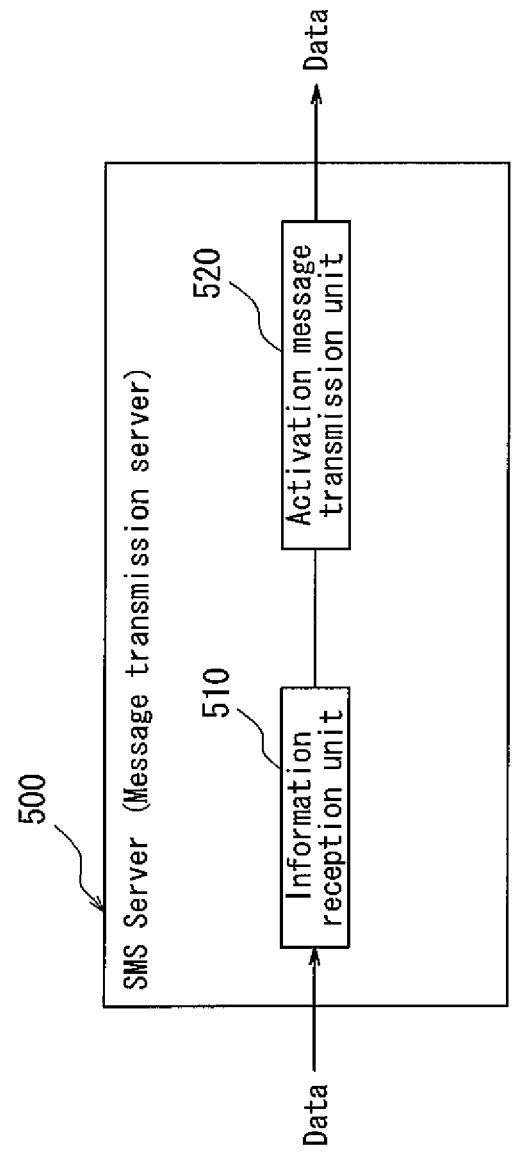

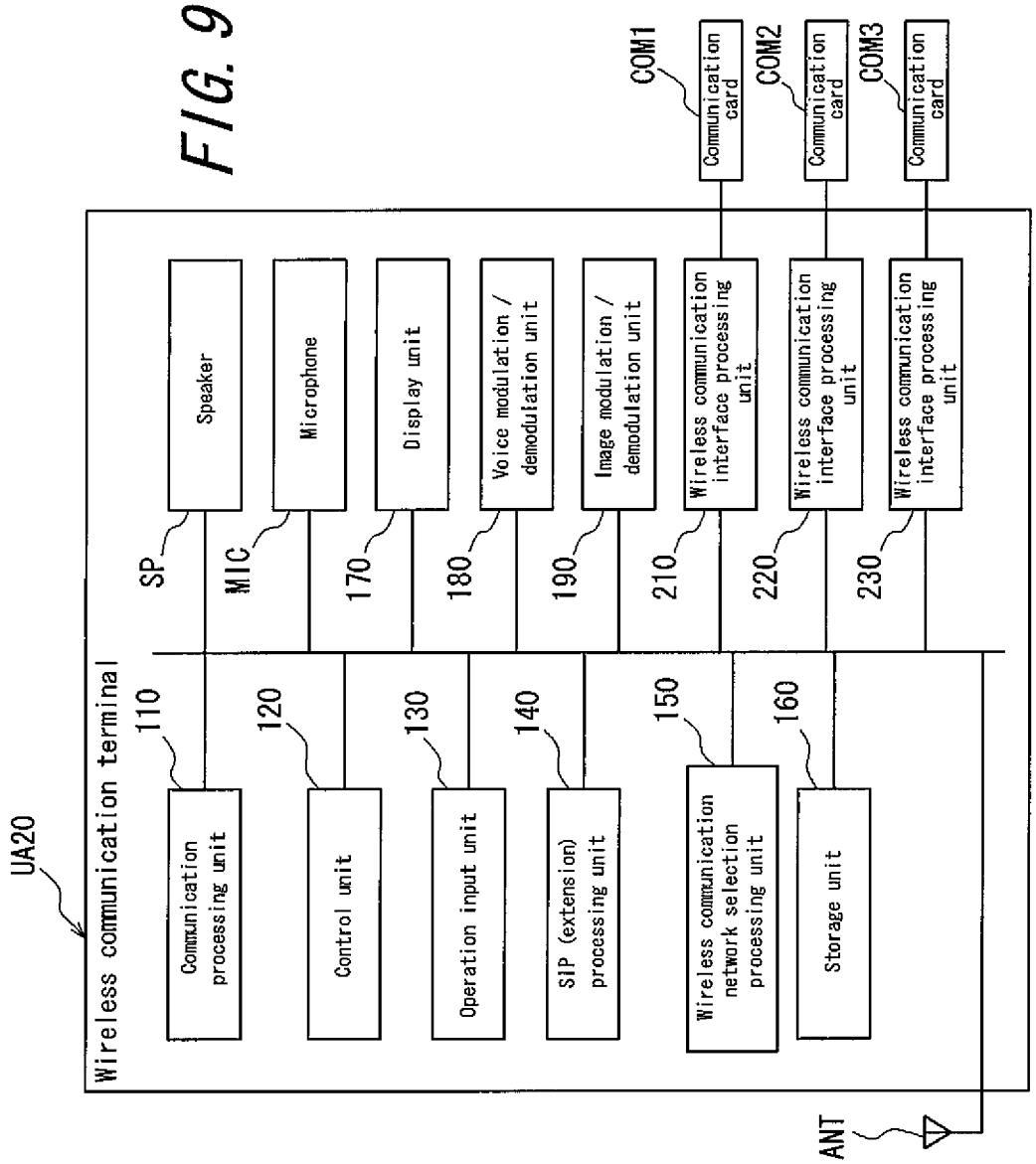

FIG. 10

```
INVITE sip:09055551234SIP/2.0
(INVITE:sip:4.3.2.1.5.5.5.5.0.9.1.8.e.1.6.4.arpa SIP/2.0)
Via:SIP/2.0/UDP sip.example.orgbranch=z9hG4bKabcd
To:sip:09055551234
(To:sip:4.3.2.1.5.5.5.5.0.9.1.8.e.1.6.4.arpa)
From:sip:userA@example.org
Call-ID:sip:1234@example.org
Cseq:1 INVITE
Contact<sip:09055551234>
Contact-Type:application/IP-TV-info+xml
Contact-Length:128

Com-Media-Sel-Pref:bandwidth  <--Extension of preference for selecting wireless
                                  communication media on incoming call side
                                  (in this case, priority is given to bandwidth over billing)

Required:Com-Media-Sel-Pref:bandwidth:billing  <--Extension header and option tag are notified.

b="" AS:500"  <-- Application Specifc bandwidth is indicated.
```

FIG. 11

```
INFO sip:UserB@example.org SIP/2.0
(Via:SIP/2.0/UDP sip.eample.org:branch=z9hG4bKabcd
To:sip:UserA@example.org
From:sip:userB@example.org
Call-ID:sip:1234@example.org
Cseq:1 INFO
Contact<sip:UserA@example.org>
Contact-Type:application/IP-TV-info+xml
Contact-Length:128

Com-Media-Sel-Pref-Result:IEEE802.16e:      <--New header for indicating selection result of wireless communication
                                               media on incoming call side (in this case, IEEE.802.16e is selected)
Radio-status:Strong                         <-- New header for indicating wireless state of selected
                                               wireless communication NW
                                               (in this case, radio wave state is strong electric field)
Required:Com-Media-Sel-Pref-Result:Radio-status   <--New header is added.
Required:IEEE802.162:CDMA1X:EV-DO:WLAN      <-- New parameter of Com-Media-Sel-Pref-Resul is added.
Required:Strong:Medium:Weak                 <-- New parameter of Radio_Status is added.
```

FIG. 28

```
INVITE sip:09055551234SIP/2.0
(INVITE:sip:4.3.2.1.5.5.5.5.0.9.1.8.e.1.6.4.arpa SIP/2.0)
Via:SIP/2.0/UDP sip.example.org.branch=z9hG4bKabcd
To:sip:09055551234
(To:sip:4.3.2.1.5.5.5.5.0.9.1.8.e.1.6.4.arpa)
From:sip:userA@example.org
Call-ID:sip:1234@example.org
Cseq:1 INVITE
Contact<sip:09055551234>
Contact-Type:application/IP-TV-info+xml
Contact-Length:128 m=audio 49170 RTP/AVP 96
a=rtpmap:96<EVRC/8000           <--Request of change CODEC to EVRC (Rate:8kbps)
```

FIG. 29

```
INFO sip:UserB@example.org SIP/2.0
Via:SIP/2.0/UDP sip.example.org;branch=z9hG4bKabcd
To:sip:UserA@example.org
From:sip:userB@example.org
Call-ID:sip:1234@example.org
Cseq:1 INFO
Contact<sip:UserA@example.org>
Contact-Type:application/IP-TV-infp+xml
Contact-Length:128

L2_Information_Event:Link_Going_Down;    <--New header for notifying L2 information event Handover_Destination:EV-DO;              <--New header for indicating wireless communication NW
                                            of handover destination
                                            (in this case,handover to EV-DO)

Handover_Destination_bandwidth:300;      <--Bandwidth of wireless NW of handover destination (300kbps)

Handover_Destination_delay:150;          <--Delay time of wireless communication NW
                                            of handover destination (150ms)
Required:L2_Information_Event            <--Add new header
Required:Handover_Destination            <--Add new header
Required:Handover_Destination_bandwidth  <--Add new header
Required:Handover_Destination_delay      <--Add new header
Required:Going_Down:Link_Parameter_Change:Link_Up:Link_Down:
              Handover_initiation:handover_Complete:   <--Notification of new parameter
                                                          of L2_information
Required:IEEE802.162:CDMA1X:EV-DO:WLAN   <--Notification of new parameter of Handover_Destination
```

FIG. 30

Selection of policy relating to application associated with handover

1) Parameter such as CODEC and Rate is automatically changed in accordance with wireless characteristics of NW of handover destination 2) User specifies parameter such as CODEC and Rate in accordance with wireless characteristics of NW of handover destination
   CODEC: EVRC/G729/G711/Speex(VBR)
   Rate(in the case of VBR CODEC): 8k/10k/16k/24k/32k 3) Application is automatically changed to the most suitable one in accordance with wireless characteristics of NW of handover destination 4) User changes application based on wireless characteristics of NW of handover destination
   Handover to wireless NW1: VoIP/Chat
   Handover to wireless NW1: TV phone/IP TV phone/Group communication (TV conference)

5) No change

COMMUNICATION SYSTEM, WIRELESS COMMUNICATION TERMINAL, COMMUNICATION METHOD, WIRELESS COMMUNICATION METHOD, WIRELESS COMMUNICATION APPARATUS AND CONTROL METHOD THEREOF

CROSS-REFERENCE TO RELATED APPLICATION

This application is a national stage of International Application No. PCT/JP2007/075034 filed on Dec. 26, 2007, which also claims the benefit of priority under 35 USC 119 to Japanese Patent Application No. 2006-353156 and Japanese Patent Application No. 2006-353279 both filed on Dec. 27, 2006, and Japanese Patent Application No. 2007-019624 filed on the Jan. 30, 2007 entire contents of which are incorporated herein by reference.

TECHNICAL FIELD

The present invention relates to a communication system, a wireless communication terminal, a communication method, a wireless communication method, a wireless communication apparatus and a control method thereof.

BACKGROUND ART

The SIP (Session Initiation Protocol) standard is defined as one of the communication control protocols for realizing call control such as connection request in a real-time application such as Internet phone that applies VoIP (Voice over Internet Protocol) (see Non-Patent Document 1).

The SIP at the beginning had been used for VoIP communications between computers such as PCs and servers that are connected through wired networks of the Internet. However, in these years, transition to digital and IP technologies has accelerated also with respect to the wireless communication apparatus, and SIP servers and wireless communication terminals of wireless communication carriers (operators) who support the SIP have been developed. Further, recently, with development of the wireless communication technology, one wireless communication terminal is able to have a plurality of wireless communication devices that can be connected to different wireless communication networks. A typical configuration is a PDA, a PC or a cellular phone having the first wireless communication device connected to a cellular phone network and the second wireless communication device connected to a station of wireless LAN and MAN (Metropolitan Area Network) such as WiFi and WiMAX.

Non-Patent Document 1: Website: http://www.ietf.org/rfc/rfc3261.txt (RFC document that defines the SIP).

SUMMARY OF INVENTION

Technical Problem

However, the SIP technology is originally intended for the wired communication networks, and the wireless communication networks whose bandwidth and communication quality vary in a moment have not been assumed. Moreover, the SIP technology was not intended for a wireless communication apparatus or the like that can be connected to a plurality of wireless communication networks. In other words, although development of the SIP technology for a wired communication network of the Internet is advanced, development of the SIP technology based on the assumption that there are a plurality of different types of wireless communication networks and communications are performed in a communication environment that spans such plurality of different types of wireless networks have not progressed so much.

FIG. 2 shows a wireless communication network block diagram in accordance with the conventional art. As shown in the figure, as servers and gateways, there are a DNS server 10, a SIP server 20, a SIP server 30, a gateway (GW)40, an SMS server 50, a SIP server (or GW)60, and a SIP server (or GW)70. As a communication terminal and a soft phone on an outgoing call side and an incoming call side, there are wireless communication terminals UA1 and UA2 and a communication terminal (soft phone) UA3. Each of these terminals is connected to the above-mentioned each server through an Internet NET 1, an operator packet network NET2, an operator circuit switching network NET3 and operator wireless communication packet networks RNET1 and RNET2.

In addition, FIG. 15 shows another wireless communication network block diagram in accordance with the conventional art. In the wireless communication network configuration of FIG. 15, in addition to the components of FIG. 14, there are a base station control apparatus 80 and a base station 90. However, other components are the same as those of FIG. 14.

For example, with respect to the above-mentioned conventional art, in the wireless communication network configuration as shown in the figure, when the wireless communication terminal UA2 is called (direction of connection to the packet network and registration operation) through an SMS (short message service) message by the SMS server 50 of the circuit switching network corresponding to the operator wireless communication packet network RNET1 in response to a SIP connection request (calling: Invite) of the wireless communication terminal UA1, the wireless communication terminal UA2 performs registration operation (Register) of the SIP (Session Initiation Protocol) to the SIP server 30 through the packet switching network (in this case, RNET1) of the wireless communication network corresponding to the called circuit switching network (provided by the same telecommunications carrier) and after that, establishes communications by the SIP procedures. Such method is based on a wireless communication terminal that can use only one operator wireless communication packet network and a circuit switching network corresponding thereto. On the other hand, in the case where the wireless communication terminal UA2 has a function to connect to two operator wireless communication packet networks RNET1 and RNET2, which is, there are two options, in the case of the SIP in accordance with the conventional art (that is, the wireless communication terminal UA2 which implements the SIP), as mentioned above, registration of SIP is performed through a network (in this example, the operator wireless communication packet network RNET1) corresponding to a path through which a message containing a connection request (direction of connection to a packet network and registration operation) has passed, and a session is established with the caller side/outgoing call side (Calling Party) using this packet network path. With such session establishing method, a wish or a priority, that is, a preference relating to the bandwidth corresponding to an application the caller side user (Calling Party) desires to use or the billing the caller side user desires is not necessarily reflected. In other words, the preference of the user (Calling Party) who makes a connection request is not considered at all. Further, with respect to a wireless communication terminal on the callee side/incoming call side (Called Party), there is a problem that a plurality of connectable wireless communication paths cannot be used effectively.

However, in the case where the wireless communication terminal has a function to connect to two operator wireless communication packet networks RNET1 and RNET2 and does not correspond to a circuit switching network or can wait also by a packet network, with only a call request from the packet network, a wish or a priority, that is, a preference relating to the bandwidth corresponding to an application the caller side user (Calling Party) desires to use or the billing the caller side user desires is not necessarily reflected. In other words, the preference of the user (Calling Party) who makes a connection request is not considered at all. Further, with respect to a wireless communication terminal on the called side/incoming call side (Called Party), there is a problem that a plurality of connectable wireless communication paths cannot be used effectively.

As mentioned above, the method performed by the system of FIG. 2 is based on a wireless communication terminal corresponding to a circuit switching network. However, the caller side user (Calling Party) had a problem that, after the called side user (Called Party) has initiated communication by selecting a wireless communication network from a plurality of wireless communication networks having different attributes, the caller side user cannot grasp which wireless communication network the called side user has selected, its attribute, and the present state of the attribute (bandwidth state, modulation scheme, battery capacity, wireless link or the like). Further, the called side cannot grasp at all if the corresponding party switches the wireless communication network during call. For example, in the case where the communication quality is deteriorated when a terminal on the incoming call side moves to an area fringe in a wireless zone or the like, there was a problem that deterioration of communication quality such as packet loss is caused by a sudden switching (handover) on the corresponding party side.

Accordingly, an object of the present invention is, when a wireless communication terminal on the incoming call side has a plurality of wireless communication devices/paths (networks) as options, by selecting the most suitable wireless communication device/path (network) corresponding to the preference (wish such as bandwidth and communication fee) of the outgoing call side, to provide a technique (apparatus, system, method) for establishing a session from the beginning between the outgoing call side and the incoming call side using the wireless communication device/path (network).

A further object of the present invention is, when a wireless communication terminal on the incoming call side has a plurality of wireless communication systems (that is, wireless communication device, wireless communication path, wireless communication network or the like) as options, to provide a technique (apparatus, method) for transmitting the wireless link information of the wireless communication system that has been selected on the incoming call side to the outgoing call side.

Solutions to Problems

In order to solve the above-mentioned problems, a communication system according to the present invention comprises a call control server (voice communication, TV phone, chat or the like) for packet communication and a message transmission server, wherein the call control server (SIP server) comprises:
a call request reception unit for receiving a call request (Invite message) containing preference information of an outgoing call side (Calling Party: a wireless/wired communication terminal on a caller side) and for calling an incoming call side (Called Party: a wireless communication terminal on a callee side); and
a call request transmission unit for transmitting call request reception information (Info message) containing information indicating that the call request has been received and the preference information contained in the call request to the message transmission server in order to convey the received call request to the callee side, and the message transmission server (SMS server) comprises:
an information reception unit for receiving the call request reception information transmitted from the call control server; and
an activation message transmission unit for transmitting an activation message (SMS message) for activating process of login to the call control server for packet communication (e.g. SIP communication application, SIP communication unit or the like for processing communications provided at a terminal on the incoming call side) by containing the preference information contained in the call request reception information, based on the received call request reception information, to the incoming call side.

Further, in the communication system in accordance with an embodiment of the present invention, the preference information (selection criterion) contains at least one of bandwidth related information (bandwidth priority or the like) relating to bandwidth of a communication line used by the communication and billing related information (billing priority) relating to billing for the communication.

In addition, in the communication system in accordance with another embodiment of the present invention,
the communication system further comprises a wireless communication terminal as the incoming call side capable of being connected to a plurality of wireless communication systems, and the wireless communication terminal comprises:
a reception unit for receiving the activation message (SMS message) containing the preference information transmitted from the message transmission server; and
a control unit for controlling to select one wireless communication system among the plurality of wireless communication systems based on the preference information of the outgoing call side contained in the received activation message, connect to the selected one wireless communication system and perform process of login to the call control server through the connected wireless communication system.

Further, a wireless communication terminal in accordance with another embodiment of the present invention capable of being connected to a plurality of wireless communication systems comprises:
a reception unit for receiving an activation message containing preference information of an outgoing call side (Calling Party: a wireless/wired communication terminal on a caller side) and for activating process of login to a call control server for packet communication from a message transmission server; and
a control unit for controlling to select one wireless communication system among the plurality of wireless communication systems based on the preference information of the outgoing call side contained in the received activation message, connect to the selected one wireless communication system and perform process of login to the call control server through the connected wireless communication system.

Further, in the wireless communication terminal in accordance with another embodiment of the present invention, the preference information (selection criterion) contains at least one of bandwidth related information (bandwidth priority or the like) relating to bandwidth of a communication line used by the communication and billing related information (billing priority) relating to billing for the communication.

In addition, the wireless communication terminal in accordance with another embodiment of the present invention further comprises a transmission unit for transmitting radio state information indicating a radio state of wireless communication in the connected wireless communication system to the outgoing call side.

Moreover, in the wireless communication terminal in accordance with another embodiment of the present invention, the reception unit receives the radio state information transmitted from an incoming call side indicating the radio state of the wireless communication of the wireless communication system to which the incoming call side is connected, and the wireless communication terminal further comprises a display unit for displaying the received radio state information.

As mentioned above, solution to problem of the present invention has been described as a system and a terminal (apparatus). However, it will be appreciated that the present invention can be realized as methods, programs and memory media for storing programs that are substantially equivalent to the system and the terminal (apparatus), and these methods, programs and memory media for storing programs fall within the scope of the present invention.

For example, in a communication method in accordance with another embodiment of the present invention that defines the present invention as a method is a communication method using a call control server (SIP server) for packet communication and a message transmission server (SMS server), the call control server (SIP server) comprises the steps of:

receiving a call request (Invite message) containing preference information of an outgoing call side (Calling Party: a wireless/wired communication terminal on a caller side) and for calling an incoming call side (Called Party: a wireless communication terminal on a callee side); and transmitting call request reception information (Info message) containing information indicating that the call request has been received and the preference information contained in the call request to the message transmission server in order to convey the received call request to the incoming call side, and the message transmission server (SMS server) comprises the steps of:

receiving the call request reception information transmitted from the call control server; and transmitting an activation message (SMS message) for activating process of login to the call control server for packet communication (e.g. SIP communication application, SIP communication unit or the like for processing communications provided at a terminal on the incoming call side) by containing the preference information contained in the call request reception information, based on the received call request reception information, to the incoming call side.

Further, a wireless communication method in accordance with an embodiment of the present invention is a wireless communication method of a wireless communication terminal capable of being connected to a plurality of wireless communication systems, comprising the steps of:

receiving an activation message containing preference information of an outgoing call side and for activating process of login to a call control server for packet communication from a message transmission server; and by using an operation unit (a processor such as a CPU and a DSP), controlling to select one wireless communication system among the plurality of wireless communication systems based on the preference information of the outgoing call side contained in the received activation message, connect to the selected one wireless communication system and perform process of login to the call control server through the connected wireless communication system.

As mentioned above, the present invention has been described as an embodiment that uses a message transmission server (SMS server). However, it will be appreciated that the present invention can also be realized as an embodiment that uses a paging control apparatus (a base station, a base station control apparatus, a SIP server or the like) and they fall within the scope of the present invention.

A communication system in accordance with an embodiment of the present invention comprising a call control server for packet communication (voice communication, TV phone, chat or the like) and a paging control apparatus for processing a paging message transmitted to a wireless communication system, wherein the call control server (SIP server) comprises:

a call request reception unit for receiving a call request (Invite message) containing preference information of an outgoing call side (Calling Party: a wireless/wired communication terminal on a caller side) and for calling an incoming call side (Called Party: a wireless communication terminal on a callee side); and a call request transmission unit for transmitting call request reception information (Info message) containing information that indicates that the call request has been received and the preference information contained in the call request to the message transmission server in order to convey the received call request to the incoming call side, and the paging control apparatus (a base station, a base station control apparatus, a SIP server or the like) comprises:

an information reception unit for receiving the call request reception information transmitted from the call control server; and a paging message transmission control unit for controlling to transmit a paging message for calling the incoming call side and conveying an incoming call to the incoming call side with containing the preference information contained in the call request reception information, based on the received call request reception information, to the wireless communication system.

Further, in the communication system in accordance with another embodiment of the present invention, the preference information (selection criterion) contains at least one of bandwidth related information (bandwidth priority or the like) relating to bandwidth of a communication line used by the communication and billing related information (billing priority) relating to billing for the communication.

In addition, in the communication system in accordance with another embodiment of the present invention, the communication system further comprises a wireless communication terminal as the incoming call side capable of being connected to a plurality of wireless communication systems, and the wireless communication terminal comprises:

a reception unit for receiving the paging message containing the preference information transmitted from the paging control apparatus; and a control unit for controlling to select one wireless communication system among the plurality of wireless communication systems based on the preference information of the outgoing call side contained in the received paging message, connect to the selected one wireless communication system and perform process of login to the call control server through the connected wireless communication system.

A wireless communication terminal in accordance with another embodiment of the present invention capable of being connected to a plurality of wireless communication systems comprises:

a reception unit for receiving a paging message for calling the terminal from a wireless communication system under a standby status among the plurality of wireless communication systems and informing an incoming call to the terminal; and a control unit for controlling to select one wireless communication system among the plurality of wireless communication systems based on the preference information of the outgoing call side contained in the received paging message, connect to the selected one wireless communication system and perform process of login to a call control server through the connected wireless communication system.

Further, in the wireless communication terminal in accordance with another embodiment of the present invention, the preference information (selection criterion) contains at least one of bandwidth related information (bandwidth priority or the like) relating to bandwidth of a communication line used by the communication and billing related information (billing priority) relating to billing for the communication.

In addition, the wireless communication terminal in accordance with another embodiment of the present invention further comprises a transmission unit for transmitting radio state information indicating a radio state of wireless communication in the connected wireless communication system to the outgoing call side.

Moreover, in the wireless communication terminal in accordance with another embodiment of the present invention, the reception unit receives the radio state information, transmitted from a corresponding party, indicating the radio state of the wireless communication in the wireless communication system to which the corresponding party is connected, and the wireless communication terminal further comprises a display unit for displaying the received radio state information.

It will be appreciated that the above-mentioned embodiment can also be realized as methods, programs and memory media for storing programs that are substantially equivalent to the embodiment, and these methods, programs and memory media for storing programs fall within the scope of the present invention.

For example, a communication method in accordance with another embodiment of the present invention which realizes the present invention as a method is a communication method using a call control server for packet communication (voice communication, TV phone, chat or the like) and a paging control apparatus for processing a paging message transmitted to a wireless communication system, wherein the call control server comprises the steps of:

receiving a call request (Invite message) containing preference information of an outgoing call side and for calling an incoming call side; and transmitting call request reception information (Info message) containing information indicating that the call request has been received and the preference information contained in the call request to the message transmission server in order to convey the received call request to the incoming call side, and the paging control apparatus comprises the steps of:

receiving the call request reception information transmitted from the call control server; and controlling to transmit a paging message for calling the incoming call side and conveying an incoming call to the incoming call side by containing the preference information contained in the call request reception information, based on the received call request reception information, to the wireless communication system.

A wireless communication method in accordance with an embodiment of the present invention is a wireless communication method of a wireless communication terminal capable of being connected to a plurality of wireless communication systems, comprising the steps of:

receiving a paging message for calling the terminal from a wireless communication system under a standby status among the plurality of wireless communication systems and informing an incoming call to the terminal; and by using an operation unit (a processor such as a CPU and a DSP), controlling to select one wireless communication system among the plurality of wireless communication systems based on the preference information of the outgoing call side contained in the received paging message, connect to the selected one wireless communication system and perform process of login to the call control server through the connected wireless communication system.

Further, as shown below, in the case where a wireless communication terminal on an incoming call side has a plurality of wireless communication systems (e.g. a wireless communication device, a wireless communication path, a wireless communication network or the like) as options, the present invention can be realized as an embodiment for transmitting wireless link information of a wireless communication system selected on the incoming call side to an outgoing call side.

A wireless communication apparatus (callee side: Called Party) in accordance with an embodiment of the present invention capable of using a plurality of different wireless communication systems comprises:

an acquisition unit for acquiring each wireless link information (L2 information or the like) of the plurality of different wireless communication systems;

a call detection unit for detecting a call (call by SMS, paging or the like) to the apparatus;

an incoming call detection unit (e.g. a unit for detecting reception of INVITE after login to an SIP server) for selecting one wireless communication system from the plurality of wireless communication systems when the call to the apparatus is detected by the call detection unit, and detecting an incoming call corresponding to the call by the selected wireless communication system, and a notification unit for notifying, when a session (e.g. communication by SIP session) is initiated by the call in response to the incoming call, a corresponding party (e.g. a SIP terminal) of the session of the wireless link information of the selected wireless communication system acquired by the acquisition unit during the session.

The wireless communication apparatus in accordance with another embodiment of the present invention further comprises a switching unit for switching the wireless communication system used in the session to a different wireless communication system, and the notification unit notifies the corresponding party in the session of wireless link information of the different wireless communication system before the wireless communication system used by the switching unit for the session is switched to the different wireless communication system.

Further, the wireless communication apparatus in accordance with another embodiment of the present invention further comprises a switching unit for switching the wireless communication system used in the session to a different wireless communication system, and the notification unit notifies, when the switching unit switches the wireless communication system used in the session to the different wireless communication system, the corresponding party in the session of the switching information (switching related information: e.g. bandwidth, average delay time, amount of time required for switching, billing information of a switching destination).

Moreover, a wireless communication apparatus (caller side: Calling Party) in accordance with another embodiment of the present invention comprises:

a calling unit for calling a corresponding party (station/terminal of the corresponding party: Called Party); and a reception unit for receiving, when the corresponding party selects one wireless communication system from a plurality of different available wireless communication systems and initiates a session with the corresponding party by using the selected wireless communication system in response to a calling (INVITE of SIP or the like) from the calling unit or a call (SMS and paging transmitted from an SMS server and a SIP server) based on the calling, wireless link information of the wireless communication system selected by the corresponding party from the corresponding party during the session.

In addition, the wireless communication apparatus in accordance with another embodiment of the present invention further comprises an informing unit for informing the wireless link information received by the reception unit.

Moreover, the wireless communication apparatus in accordance with another embodiment of the present invention further comprises a change unit for requesting, when the reception unit receives information indicating that the wireless communication system used in the session is switched to a different wireless communication system, based on the information indicating the switching, the corresponding party to change a parameter for an application used in the session to another parameter, and for changing, when the reception unit receives an acknowledgement to the change request from the corresponding party, to the another parameter requested to be changed to.

Further, the wireless communication apparatus in accordance with another embodiment of the present invention further comprises:

a buffer for accumulating data (packet) received by the reception unit; and a buffer control unit for controlling, when information indicating that the wireless communication system used in the session is switched to another different wireless communication system is received by the reception unit, based on the information indicating switching, the buffer to change a size of the buffer used in the session.

It will be appreciated that the above-mentioned embodiment can also be realized as methods, programs and memory media for storing programs that are substantially equivalent to the embodiment, and these methods, programs and memory media for storing programs fall within the scope of the present invention.

For example, a control method of a wireless communication apparatus in accordance with another embodiment of the present invention that realizes the present invention as a method is a control method of a wireless communication apparatus capable of using a plurality of different wireless communication systems comprising the steps of:

acquiring each wireless link information (L2 information or the like) of the plurality of different wireless communication systems (by using a reception unit);

detecting a call (call by SMS, paging or the like) to the apparatus;

selecting one wireless communication system from the plurality of wireless communication systems when the call to the apparatus is detected, and detecting an incoming call corresponding to the call by the selected wireless communication system (e.g. a step of detecting a reception of INVITE after login to a SIP server); and notifying, when a session (e.g. communication by SIP session) is initiated by the call in response to the incoming call, a corresponding party (e.g. SIP terminal) of the session of wireless link information of the selected wireless communication system acquired by the acquisition step during the session (by using a transmission unit).

Further, a control method of a wireless communication apparatus in accordance with another embodiment of the present invention comprises the steps of:

calling to a corresponding party (station/terminal of the corresponding party: Called Party) (by using a transmission unit); and receiving, when the corresponding party selects one wireless communication system from a plurality of different available wireless communication systems in response to a calling (INVITE of SIP or the like) by the calling step or a call (SMS and paging transmitted by an SMS server and a SIP server) based on the calling and initiates a session with the corresponding party using the selected wireless communication system, wireless link information of the wireless communication system selected by the corresponding party from the corresponding party (by using a reception unit) during the session.

Moreover, the control method of the wireless communication apparatus in accordance with another embodiment of the present invention further comprises a step of informing the wireless link information received by the reception step (by using an informing unit (a display unit, a voice output unit or the like)).

Advantageous Effects on Invention

In accordance with the present invention, when transmission is performed from a (wired) multimedia terminal or a wireless communication terminal of the Internet to a so-called multimode terminal having a plurality of wireless communication devices, an incoming call side (user) selects, from the beginning, the most suitable wireless communication network for a preference relating to bandwidth or billing required for an application used by an outgoing call user and communication is established. For example, in the case where the outgoing call side user would like to perform communication with the incoming call user side user by using an application that requires a large bandwidth such as IP television phone, since the bandwidth required for the application can be conveyed to the incoming call side user at the stage of call, it is possible to initiate communication by selecting a wireless communication network that is most suitable for the application from the beginning without using other wireless communication networks not suitable for the application. In addition, if the outgoing call side user places the most importance on inexpensive billing, it can be conveyed to the incoming call side user as preference information at the stage of call. Therefore, it is possible to initiate communication by selecting the most inexpensive wireless communication network from the beginning.

In addition, according to the present invention, in the case where a wireless communication terminal on an incoming call side has a plurality of wireless communication systems (wireless communication device/path/network) as options, it is possible to convey the wireless link information of the wireless communication system selected on the incoming call side to the outgoing call side. This conveyance of wireless link information enables the outgoing call side to grasp which wireless communication system (a network or the like) has been selected, what kind of attribute the selected wireless communication system (network) has, and further, what state the wireless link is in. Therefore, when communication has a problem, it is possible to quickly proceed with problem determination such as whether the problem is caused by the network on the corresponding party side or not. In addition, on the side where the wireless link information has been received (the outgoing call side), it is possible to easily know the cause of deterioration of communication quality caused by the wireless communication network on the corresponding party side, or the like.

BRIEF DESCRIPTION OF DRAWINGS

FIG. 8 is a function block diagram of an SMS server (a message transmission server);

FIG. 9 is a function block diagram of a wireless communication terminal;

FIG. 10 is a diagram showing an example of an extended INVITE message format of SIP supported by a communication apparatus such as a wireless communication terminal, a communication terminal and a SIP server in accordance with an embodiment of the present invention;

FIG. 11 is a diagram showing an example of an extended INFO message format of SIP supported by a communication apparatus such as a wireless communication terminal, a communication terminal and a SIP server in accordance with an embodiment of the present invention;

FIG. 28 is a diagram showing an example of an extended INVITE message format of SIP supported by a communication apparatus such as a wireless communication terminal, a communication terminal and a SIP server in accordance with the present invention;

FIG. 29 is a diagram showing an example of an extended INFO message format of SIP supported by a communication apparatus such as a wireless communication terminal, a communication terminal and a SIP server in accordance with the present invention;

FIG. 30 is a diagram showing an example of a display screen of a communication terminal for promoting policy selection relating to an application associated with handover;

DESCRIPTION OF THE PREFERRED EMBODIMENTS

Figure 1:
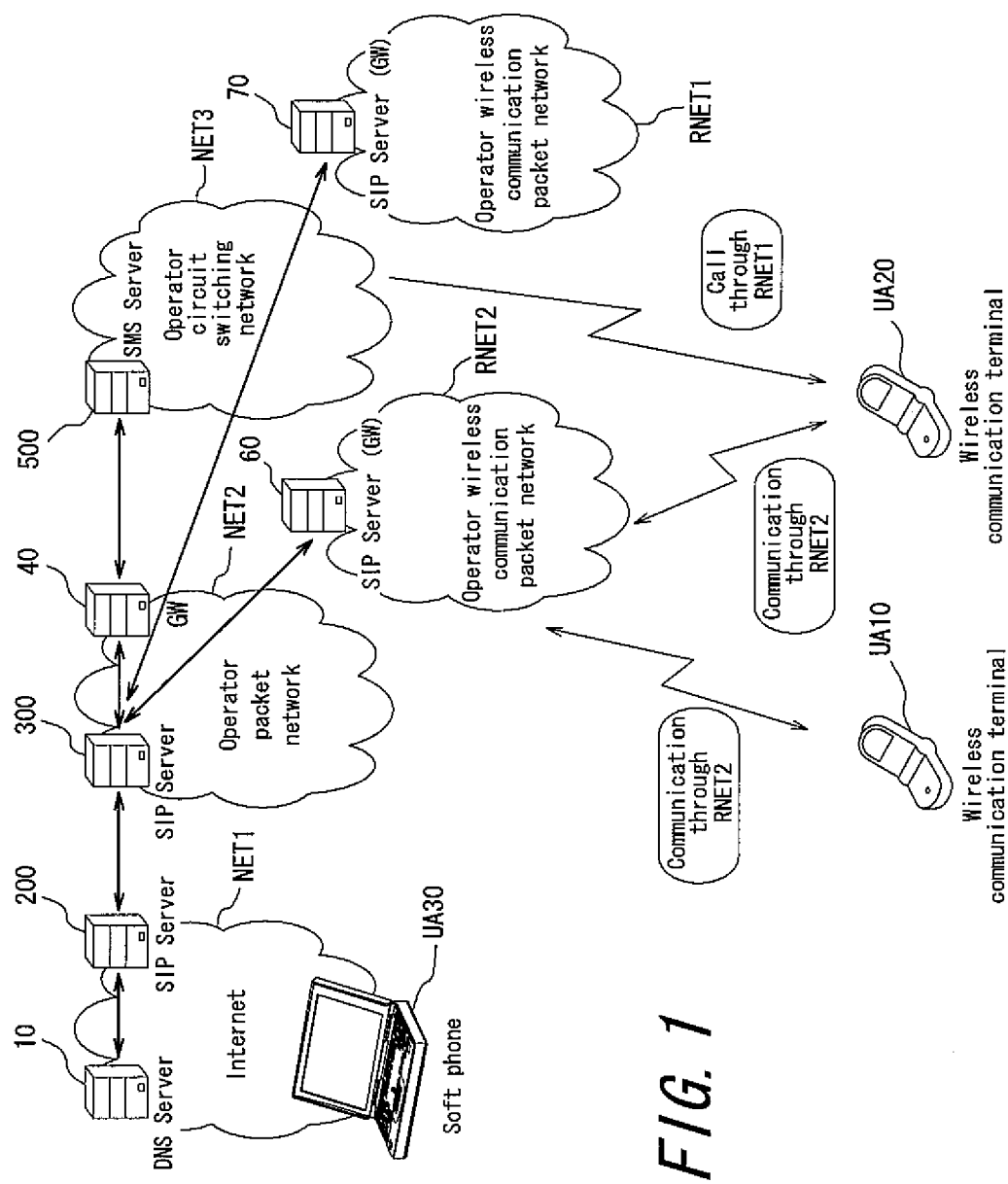
FIG. 1 is a wireless communication network block diagram in accordance with an embodiment of the present invention.
Figure 2:
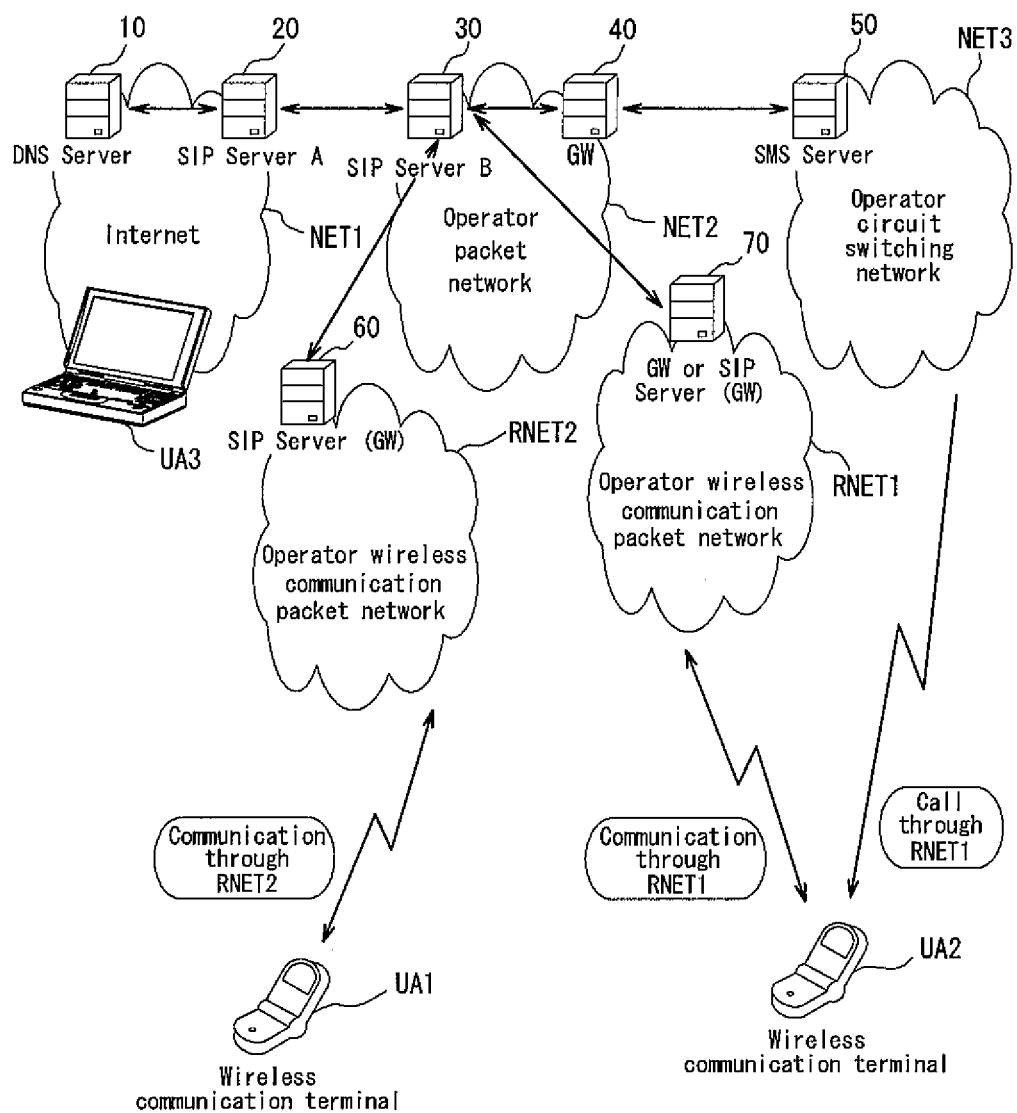
FIG. 2 is a wireless communication network block diagram in accordance with the conventional art.

Before describing the principle and configuration of the present invention in detail, a typical process sequence in accordance with an embodiment of the present invention is briefly described.

(1) In the case where an incoming call of real-time application is received by a wireless communication terminal having a plurality of wireless communication network devices, the most suitable wireless communication network is selected by considering a required bandwidth for the application which is notified from a terminal on an outgoing call side by using SIP, registration operation is performed and after that, communication state is brought about in accordance with the necessary SIP procedures.

(2) In the above-mentioned process, the wireless communication terminal on the incoming call side can be connected to a circuit switching network and a packet switching network. Then the normal standby operation is performed on the circuit switching network, and a wireless communication device connected to a plurality of packet switching networks is left to be in a dormant state or unconnected. Thus unnecessary battery consumptions can be avoided.

(3) The bandwidth required for the real-time application in process (1) is mentioned in SDP of SIP, and with respect to the standby wireless communication terminal, the wireless communication terminal is called (connection to the packet network and registration to SIP are promoted) by describing the required bandwidth in SMS (Short Message Service) and at the same time, notified of the bandwidth of the application desired by the outgoing call side.

(4) In the case where there are a plurality of wireless communication networks that meet the bandwidth conditions of the terminal on the incoming call side to which the required bandwidth is notified in process (3), a wireless communication network whose communication fee is the least expensive is selected or a wireless communication network is selected based on the priority set at the terminal on the incoming call side.

(5) In process (1), by using the SIP extension, the terminal on the outgoing call side notifies the wireless communication terminal on the incoming call side of a preference relating to selection of a wireless communication network on the incoming call side such as which to give priority, the bandwidth that is desired to be realized at the wireless communication terminal on the incoming call side or the less expensive billing.

(6) The preference of the outgoing call side of process (5) is described in SMS transmitted from the SMS server to the wireless communication terminal on the incoming call side. Then the wireless communication terminal on the incoming call side is called by the SMS and at the same time, notified of the preference on the outgoing call side.

(7) The wireless communication terminal on the incoming call side, which has received notification in process (6), selects the most suitable wireless communication network in accordance with the preference and performs registration operation in the SIP server. After that, communication state is brought about in accordance with the necessary SIP procedures.

(8) The terminal on the outgoing call side has a user interface that can select a so-called policy such as which to give priority, "realization, on the incoming call side, of the bandwidth that is most suitable for the application selected by the outgoing call side user" or "the least expensive billing". With respect to the user interface, it is possible to select by using a software key on a display or by using a hardware key beforehand. The reason why this configuration is taken is, in general, usage fee of a wireless communication network on an incoming call side (Called Party) is borne by an outgoing call side (Calling Party).

(9) The wireless communication terminal on the incoming call side conveys, to the outgoing call side terminal, a response to the requested preference through "INFO" by using a new header and new parameter (extension). As a response, a name of the selected wireless communication network and its radio state are conveyed to the communication terminal on the outgoing call side.

Figure 13:
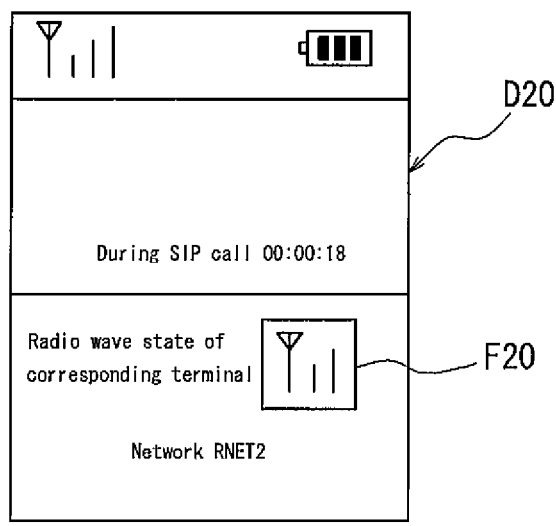
FIG. 13 is a diagram showing an example of a display screen of a communication terminal on an outgoing call side (Calling Party)

(10) In process (8), at the terminal on the outgoing call side, the wireless communication network selected by the wireless communication terminal on the incoming call side and its wireless state are displayed on a display (FIG. 13).

(11) The terminal on the outgoing call side (UAC: User Agent Client) performs negotiation with the call control server of the operator on the incoming call side on a so-called policy such as which to give priority, "realization of the bandwidth required by the wireless communication terminal (UAS: User Agent Server) on the incoming call side for a real-time application" or "the least expensive billing" and determines. At the UAS, a desired policy (available wireless communication network and average bandwidth) is registered in the call control server beforehand.

In addition, other than the communications between the wireless communication terminals subscribed to the same operator, communication can be initiated by selecting a wireless communication network that is most suitable for a preference that is desired beforehand from wireless communication terminals subscribed to different operators or from multimedia terminals on the Internet by an incoming call side user.

Embodiments in accordance with the present invention will be described below in detail with reference to the drawings.

Embodiment 1

FIG. 1 is a wireless communication network block diagram in accordance with an embodiment of the present invention. As shown in the figure, as servers and a gateways, there are a DNS server 10, a SIP server 200, a SIP server 300, a gateway (GW)40, an SMS server 500, a SIP server (or GW)60 and a SIP server (or GW)70. The SIP servers 200 and 300 serve as a call control server in accordance with the present invention, and the SMS server 500 serves as a message transmission server in accordance with the present invention. As communication terminals and soft phones on the outgoing call side and the incoming call side, there are a wireless communication terminal UA (User Agent) 10, a UA20 and a communication terminal (soft phone) UA30. Each of these terminals is connected to the above-mentioned each server and GW through an Internet NET1, an operator packet network NET2, an operator circuit switching network NETS and an operator wireless communication packet networks RNET1 and RNET2.

The wireless communication terminal UA10 is connected to the operator wireless communication packet network RNET2. On the other hand, the wireless communication terminal UA20 can be connected to the operator wireless communication packet network RNET2. The operator wireless communication packet network RNET2 is a broader bandwidth network compared to the operator wireless communication packet network RNET1. The wireless communication terminal UA20 is a so-called multimode terminal that can be connected to a plurality of wireless communication networks. Here, for simplicity, it is assumed that the wireless communication terminal UA20 can be connected to the operator wireless communication packet network RNET1 and the operator wireless communication packet network RNET2. When the wireless communication terminal UA20 waits on the circuit switching network corresponding to the operator wireless communication packet network RNET1, it is not connected to a packet switching network of the operator wireless communication packet network RNET1 and a packet switching network of the operator wireless communication packet network RNET2 and is in an unconnected state.

Here, in the case where the wireless communication terminal UA10 as an outgoing call/caller side (Calling Party), performs a call of a real-time application service to the wireless communication terminal UA20 as an incoming call/callee side, the wireless communication terminal UA10 stores a preference for executing the real-time application by the wireless communication terminal UA20 in INVITE (connection initiation request) message of SIP and conveys it to the wireless communication terminal UA20. The preference contains the following:

Bandwidth priority: Priority is given to ensuring necessary bandwidth for execution of application by the wireless communication terminal UA20.

Billing priority: Over the bandwidth, priority is given to the least expensive billing charged on the wireless communication terminal UA10.

There are the following two kinds of methods to convey such preference to the wireless communication terminal UA20.

The first method is to define a new header and a parameter in SIP protocol in order for the wireless communication terminal UA20 to convey a preference (selection criteria) for selecting and connecting one wireless communication network from a plurality of wireless communication networks by using SIP.

The second method is to notify the wireless communication terminal UA20 of the bandwidth that is specific to the application by using SDP (Session Description Protocol) of INVITE, and the wireless communication terminal UA20 selects the most suitable wireless communication network that meets the notified necessary bandwidth. In either case, the preference of the wireless communication terminal UA10 is notified by using SIP, and the SIP server of the operator of the wireless communication terminal UA20 includes the notified preference in the call request reception information and notifies the SMS server of it. The SMS server further includes the preference in an activation message (for promoting connection to a packet network and registration in the SIP server) that activates the application on the incoming call side and notifies the wireless communication terminal UA20 of it through SMS (Short Message Service). Thus the wireless communication terminal UA20 can know the preference of the wireless communication terminal UA10. After that, the wireless communication terminal UA20 selects the most suitable wireless communication network based on the notified preference and connects to it, then registration in the SIP server is performed through the selected and connected most suitable wireless communication network.

Figure 3:
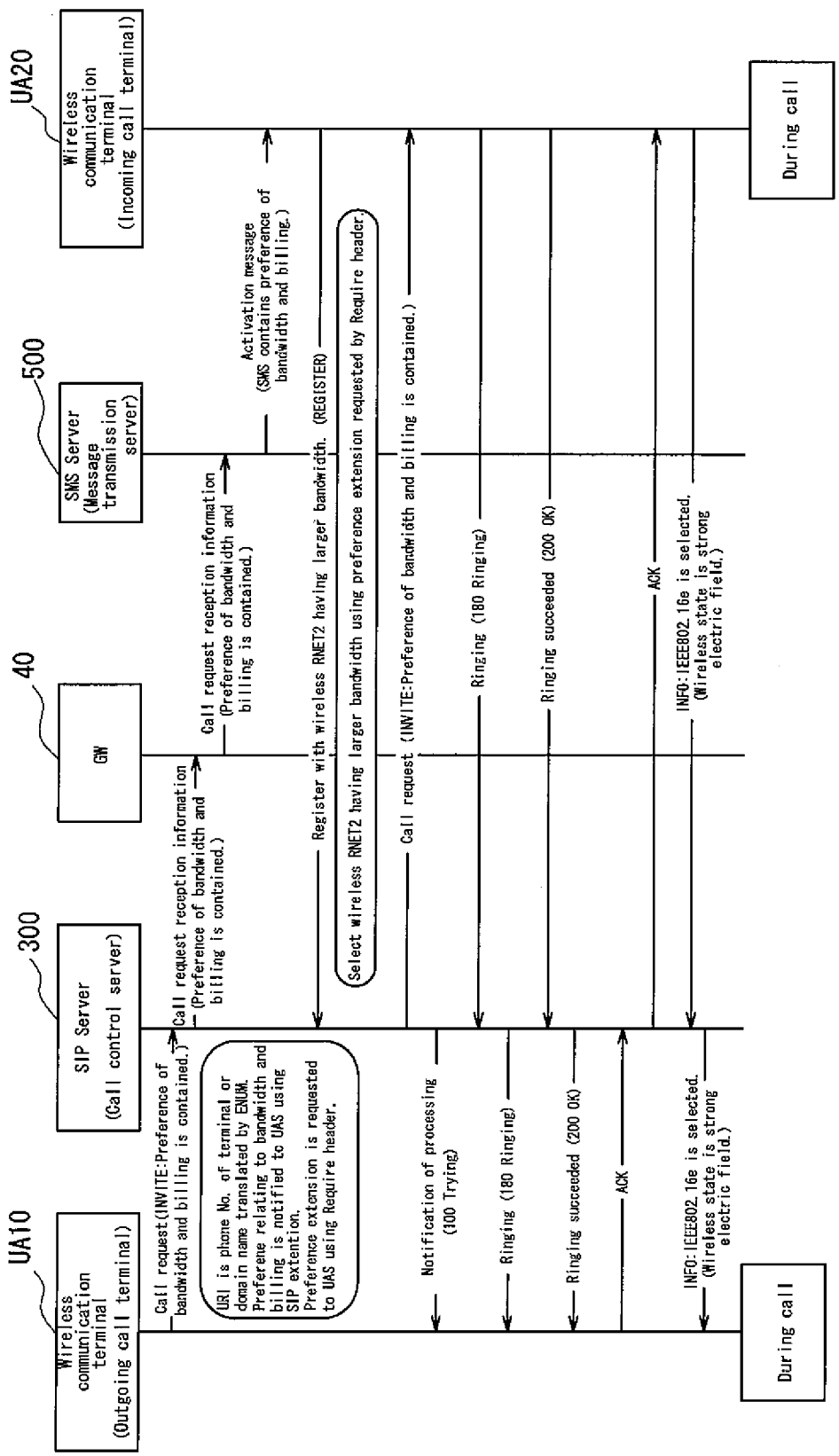
FIG. 3 is a sequence diagram in the case where communications are performed using wireless communication terminals subscribed to the same operator (wireless communication carrier)
Figure 4:
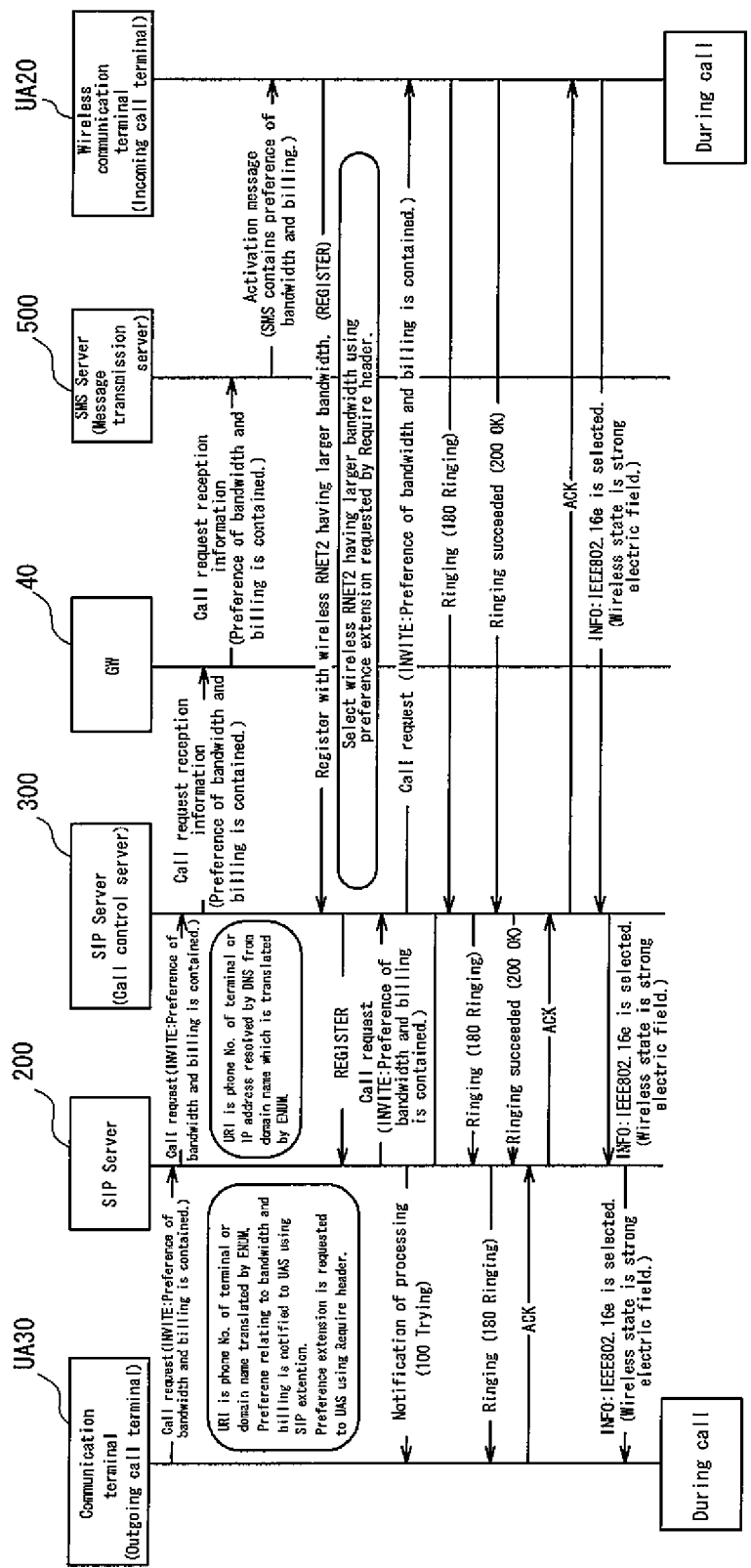
FIG. 4 is a sequence diagram in the case where communications are performed using terminals subscribed to different ISPs (Internet Service Providers)
Figure 5:
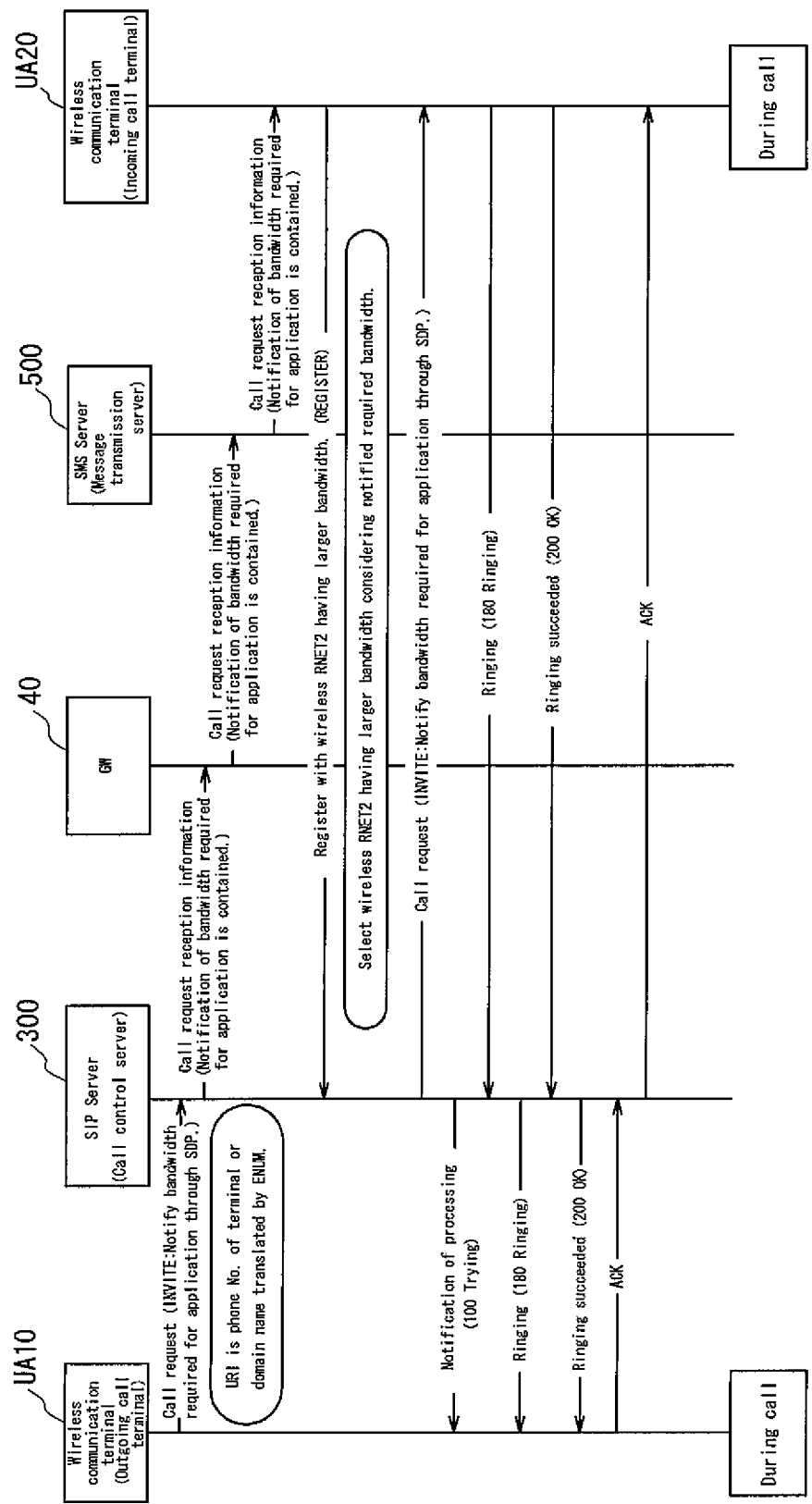
FIG. 5 is a sequence diagram in the case where communications are performed using wireless communication terminals subscribed to the same operator (wireless communication carrier)
Figure 6:
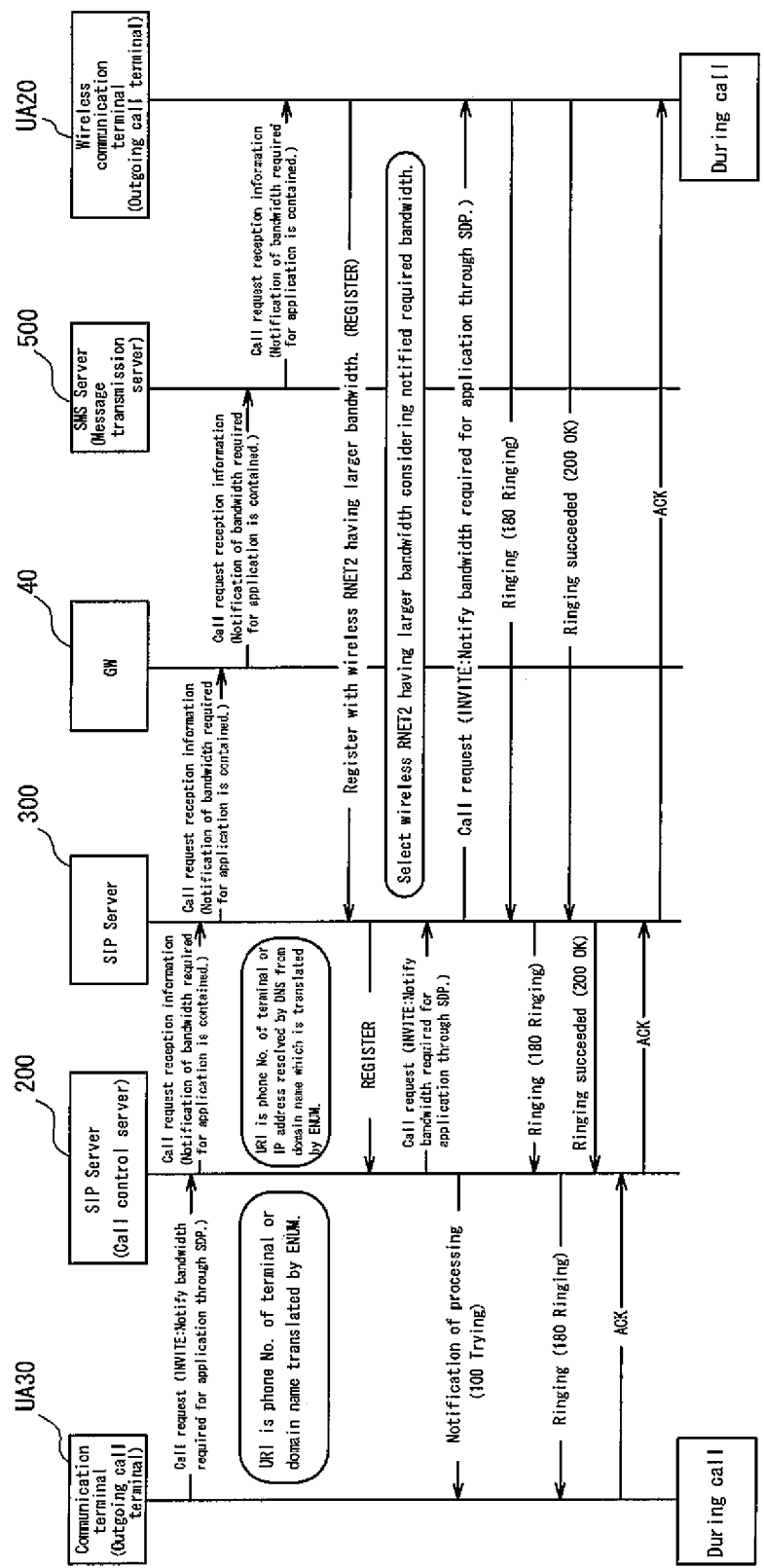
FIG. 6 is a sequence diagram in the case where communications are performed using terminals subscribed to different ISPs (Internet Service Providers)

FIGS. 3 and 5 are sequence diagrams in the case where communications are performed using wireless communication terminals subscribed to the same operator (wireless communication carrier). FIGS. 4 and 6 are sequence diagrams in the case where communications are performed using terminals subscribed to different ISPs (Internet Service Providers). FIG. 3 shows the case where a preference relating to bandwidth and billing (a preference relating to selection of a wireless communication network of the wireless communication terminal UA20) is conveyed by using the SIP extension when INVITE is transmitted to the wireless communication terminal UA20 after the wireless communication terminal UA10 performs registration in the SIP server 300. A description example of INVITE is shown in FIG. 10. INVITE transmitted from the wireless communication terminal UA10 is notified by the registered SIP server 300 to the SMS server 500 through the GW40 of the operator as the call request information containing a preference relating to bandwidth and billing. The SMS server 500 includes the notified preference in SMS and transmits an activation message (SMS message) to the wireless communication terminal UA20 through the circuit switching network. The wireless communication terminal UA20 performs, based on the content of the preference notified by the SMS, registration in the SIP server 300 through the most suitable wireless communication network. In the case of FIGS. 3~6, priority is given to bandwidth and registration is performed by the operator wireless communication packet network RNET2 having a larger bandwidth.

After that, a session (communication) is established between the wireless communication terminal UA10 and the wireless communication terminal UA20 in accordance with the SIP procedures, then the wireless communication terminal UA20 on the incoming call side notifies the wireless communication terminal UA10 on the outgoing call side of the name of the selected wireless communication network and its wireless state (radio wave strength) by using the INFO message extension. A description example of INFO is shown in FIG. 11.

FIG. 4 is a sequence diagram showing the case where the wireless communication terminal UA20 performs communication with a terminal that uses ISP which is different from that used by the wireless communication terminal UA20. In this case also, as in the case of FIG. 3, by using the SIP extension, a preference relating to bandwidth and billing is notified to the SIP server 200 of ISP (operator) of the wireless communication terminal UA20 through INVITE. INVITE containing the preference information is processed by redirecting from the SIP server 200 to the SIP server 300. In other words, in the present configuration, the SIP server 200 behaves as a conventional SIP server, and the SIP server 300 serves as a call control server that supports a new SIP format in accordance with the present invention. The following sequence is the same as that of FIG. 3.

FIGS. 5 and 6 are sequence diagrams where the SIP extension is not used. In this case, the wireless communication terminal UA10 or the communication terminal UA30 includes the bandwidth information of SDP in INVITE and transmits it to the wireless communication terminal UA20. In the same manner, the SDP bandwidth information is notified from the SIP server 300 to the SMS server 500 through the GW40 as the call request reception information. Then, the SMS server 500 notifies the wireless communication terminal UA20 of an activation message containing the bandwidth information as the preference information. In this case, there is no preference relating to billing, and the SMS server 500 notifies the wireless communication terminal UA20 of only necessary bandwidth of the application used by the terminal on the outgoing call side. Therefore, the wireless communication terminal UA20 performs registration in the SIP server 300 (in the case of the same operator) by using the most suitable wireless communication network that can stably meet the notified necessary bandwidth. When there is a plurality of wireless communication networks that meet the bandwidth conditions, it is preferable to select the wireless communication network whose communication fee is the least expensive.

Figure 7:
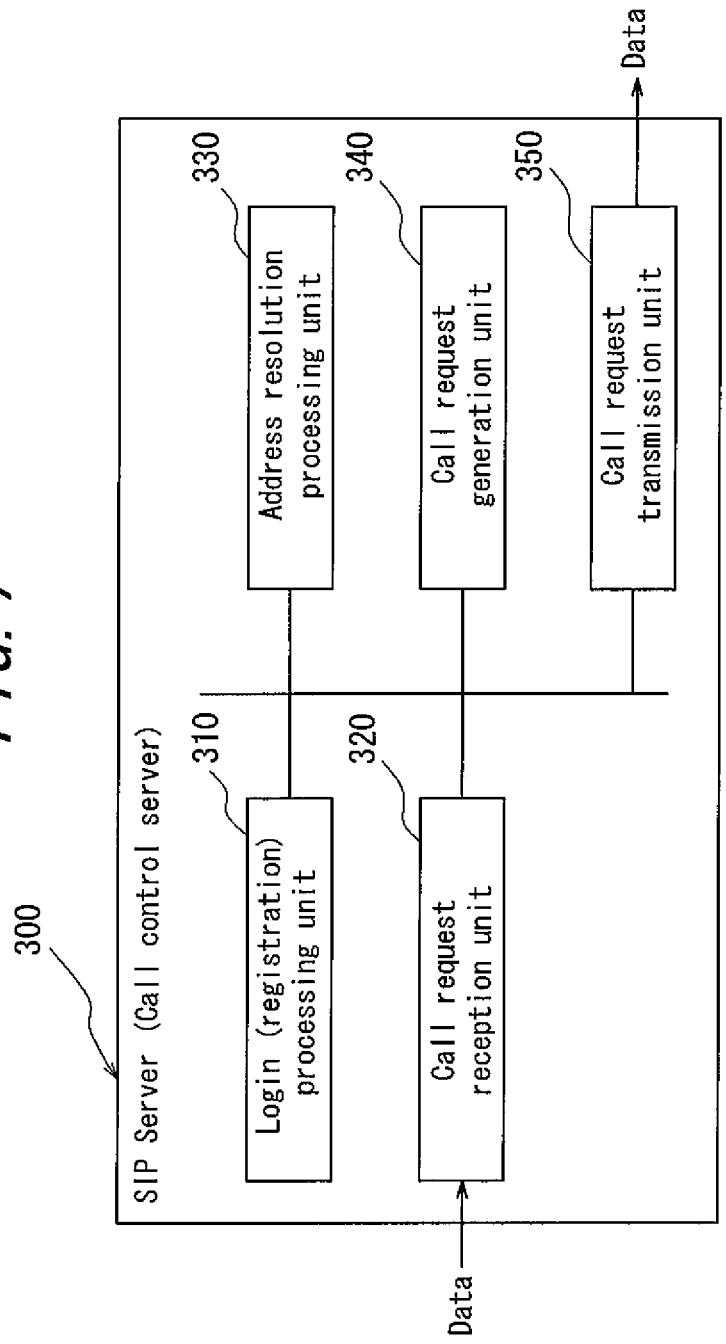
FIG. 7 is a function block diagram of a SIP server (a call control server)

FIG. 7 is a function block diagram of a SIP server (call control server). As shown in the figure, the SIP server 300 has a login (registration) processing unit 310, a call request reception unit 320, an address resolution processing unit 330, a call request generation unit 340 and a call request transmission unit 350. The login (registration) processing unit 310 receives a login (registration) request (Register) from a terminal and performs necessary processing. The call request reception unit 320 receives a call request (Invite message) containing the preference information of the outgoing call side and for calling the incoming call side. The call request generation unit 340, in order to convey the call request received by the call request reception unit 320 to the incoming call side, generates the call request reception information (Info message) containing the information indicating that the call request is received and the preference information contained in the call request, and the call request transmission unit 350 transmits the generated call request reception information (Info message) to the SMS server (a message transmission server).

FIG. 8 is a function block diagram of the SMS server (message transmission server). As shown in the figure, the SMS server 500 has an information reception unit 510 and an activation message transmission unit 520. The information reception unit 510 receives the call request reception information transmitted from the SIP server (call control server). The activation message transmission unit 520 includes the preference information contained in the call request reception information in an activation message (SMS message) for activating communication with the outgoing call side based on the call request reception information received by the information reception unit 510 and transmits it to the incoming call side.

FIG. 9 is a function block diagram of a wireless communication terminal. As shown in the figure, the wireless communication terminal UA20 has a communication processing unit 110, a control unit (CPU, processor) 120, an operation (preference) input unit 130, a SIP (extension) processing unit 140, a wireless communication network selection processing unit 150, a storage unit 160, a speaker SP, a microphone MIC, a display unit 170, a voice modulation/demodulation unit 180 and an image modulation/demodulation unit 190. The wireless communication terminal UA20 further includes three wireless communication interface processing units 210, 220 and 230 and an antenna ANT. To each of the wireless communication interface processing units 210, 220 and 230, communication cards COM1, COM2 and COM3 having a function to connect to different wireless communication networks respectively are attached. It should be noted that the wireless communication unit is not limited to such an external connection type, and may be a built-in type.

FIG. 10 is a diagram showing an example of extended INVITE message format of SIP supported by a communication apparatus such as a wireless communication terminal, a communication terminal and a SIP server in accordance with an embodiment of the present invention. As shown in the figure, a "Com-Media-Sel-Pref" header for conveying the preference information of the outgoing call side is introduced to INVITE message, and as values of the "Com-Media-Sel-Pref" header, "bandwidth" that specifies a bandwidth priority and "cost" that specifies a billing priority are introduced. Further, B="AS:500"(500 kB/sec) is also specified as a sub-field that specifies the bandwidth specific to an application. Introduction of such new SIP message format allows conveyance of the preference information of the outgoing call side to the incoming call side as in the case of the present invention.

FIG. 11 is a diagram showing an example of extended INFO message format of SIP supported by a communication apparatus such as a wireless communication terminal, a communication terminal and a SIP server in accordance with an embodiment of the present invention. As shown in the figure, in order to convey the corresponding state of the incoming call side with respect to the preference information of the outgoing call side, a "Com-Media-Sel-Pref-Result" header is introduced to INFO message, and selected corresponding state, for example, a name of the wireless communication device/network, or the protocol to be used is entered in the value of the "Com-Media-Sel-Pref-Results" header field. In this example, "IEEE.802.16e" indicating the selection result of the wireless communication device/network on the incoming call side is specified. In addition, a "Radio-Status" header is newly introduced, and as a value of the "Radio-Status" header field, either one of "Strong", "Medium" or "Weak" indicating the radio state is specified.

Figure 12:
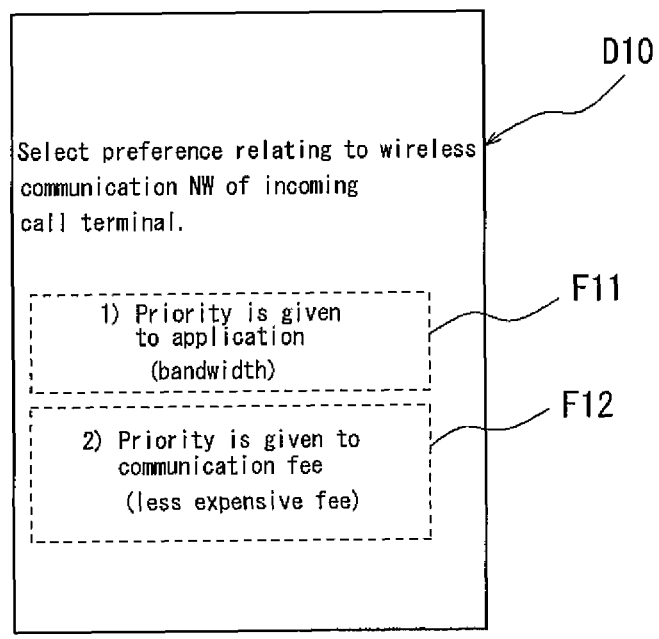
FIG. 12 is a diagram showing an example of a display screen of a communication terminal on an outgoing call side (Calling Party)

FIG. 12 is a diagram showing an example of a display screen of a communication terminal on the outgoing call side (Calling Party). As shown in the figure, on a screen D10, two option fields F11 and F12 of the preference information of the outgoing call side that are desired to be used for selecting a wireless communication network on the incoming call side are shown. The user specifies and selects one desired field from the two options, and the selected option is stored in a predetermined section of INVITE message of SIP or in SDP as the preference information.

FIG. 13 is a diagram showing an example of a display screen of a communication terminal on the outgoing call side (Calling Party). As shown in the figure, on a screen D20, the radio state (radio wave propagation environment) of the wireless communication network selected and used by the incoming call side is displayed on the radio state display field F20. The field intensity is indicated by the number of vertical bars shown on the right of the antenna mark. One piece of bar shows weak field intensity, two pieces show middle field intensity and three pieces show strong field intensity. In this example, the number of antennas is two in the wireless communication environment of the terminal on the corresponding party side, which shows middle field intensity. In embodiment 1, the present invention is described as an embodiment that uses a message transmission server (SMS server). However, in embodiment 2 shown below, the present invention is described as an embodiment that uses a paging control apparatus (base station, base station control apparatus, SIP server or the like).

Embodiment 2

Embodiment 2 in accordance with the present invention will be described in detail. A typical process sequence in accordance with embodiment 2 is almost the same as that of embodiment 1 except for processes (6) and (11). Therefore, only processes (6) and (11) that are different from embodiment 1 are described, and description of other processes is omitted.

(6) The preference of the outgoing call side of process (5) is described in a paging message transmitted from a base station served as a paging control apparatus to a wireless communication terminal on the incoming call side, and the wireless communication terminal on the incoming call side is called by the paging message and is notified of the preference of the outgoing call side at the same time. Or, it is possible to make the SIP server and the base station control apparatus serve as a paging control apparatus and configure such that these apparatuses control the base station control apparatus and the base station, which are subordinate apparatuses, to transmit a paging message.

(11) The terminal on the outgoing call side (UAC: User Agent Client) performs negotiation with the SIP server (or a base station and a base station control apparatus served as a paging control apparatus) on a so-called policy such as which to give priority, "realization of the bandwidth required by the wireless communication terminal (UAS: User Agent Server) on the incoming call side for a real-time application" or "the least expensive billing" and determines. At the UAS, available wireless communication networks and average bandwidths are registered in the SIP server (or a base station and a base station control apparatus served as a paging control apparatus).

Figure 14:
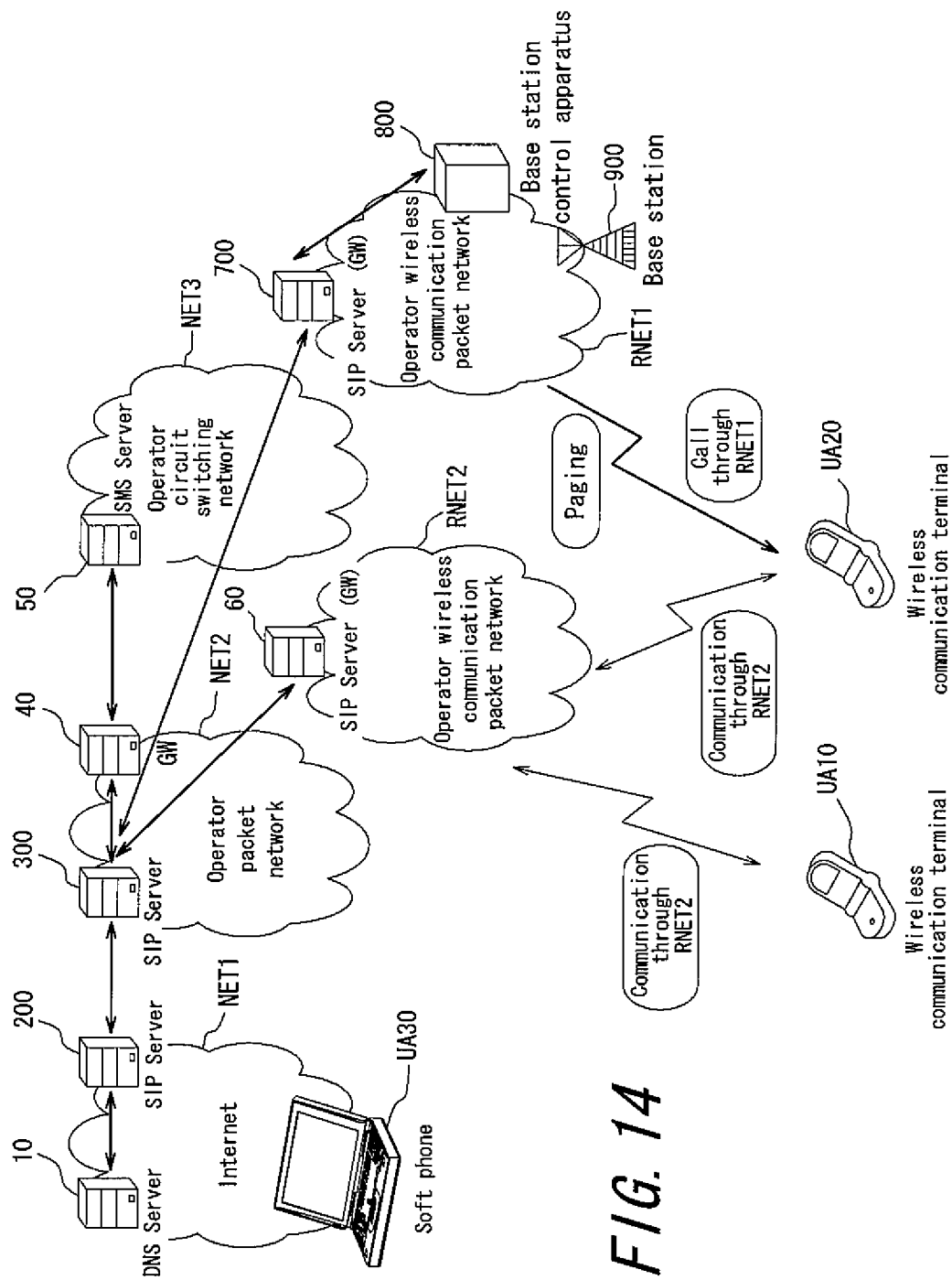
FIG. 14 is a wireless communication network block diagram in accordance with an embodiment of the present invention.
Figure 15:
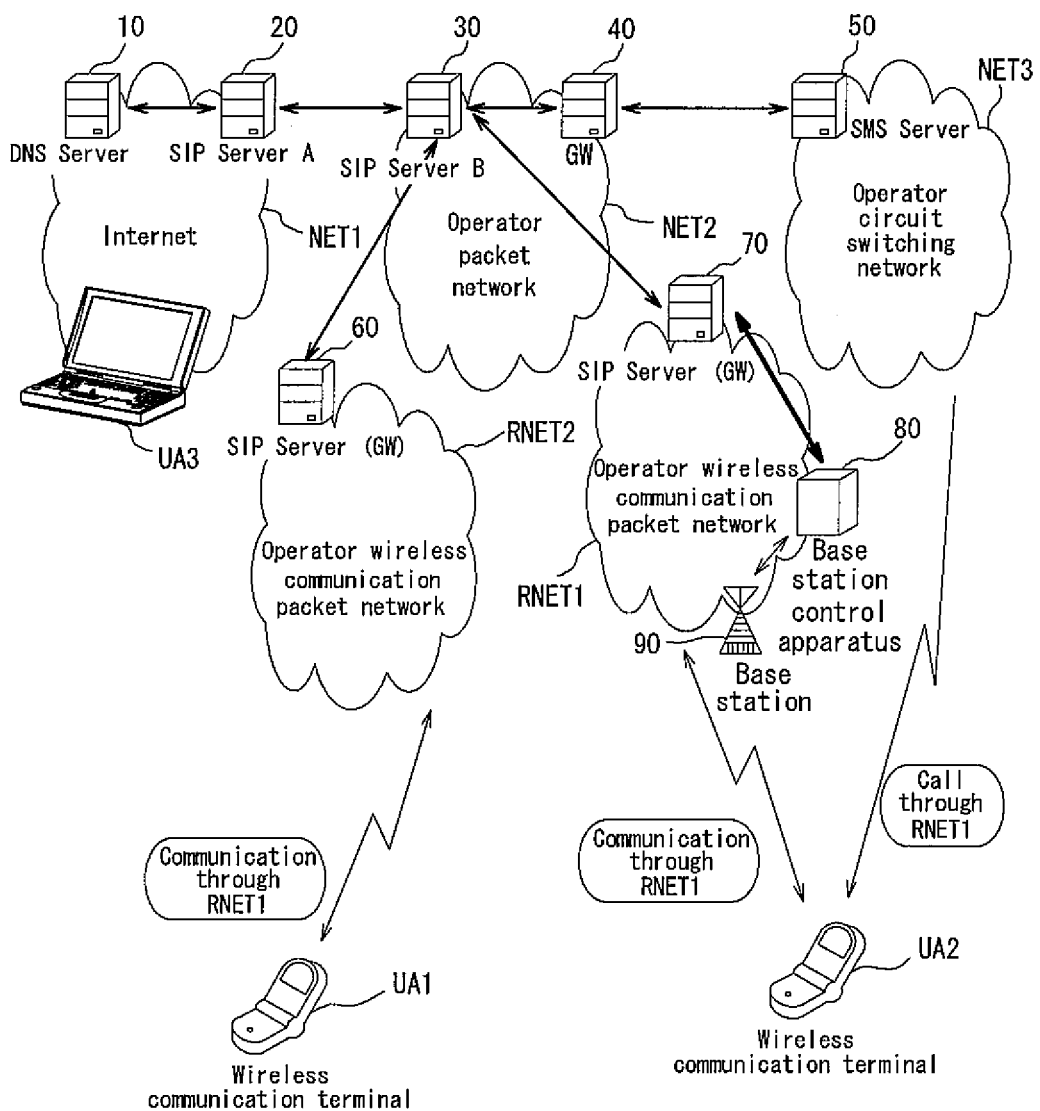
FIG. 15 is a wireless communication network block diagram in accordance with the conventional art.

FIG. 14 is a wireless communication network block diagram in accordance with an embodiment of the present invention. As shown in the figure, as servers and gateways, there are a DNS server 10, a SIP server 200, a SIP server 300, a gateway (GW)40, an SMS server 500, a SIP server (or GW)60 and a SIP server (or GW)700. The SIP servers 200 and 300 serve as a call control server in accordance with the present invention, and the SIP server 700 (or a base station control apparatus 800, a base station 900) serves as a message transmission server in accordance with the present invention. As communication terminals and soft phones on the outgoing call side and the incoming call side, there are a wireless communication terminal UA (User Agent)10, a UA20 and a communication terminal (soft phone) UA30. Each of these terminals is connected to the above-mentioned each server and GW through an Internet NET1, an operator packet network NET2, an operator circuit switching network NET3 and an operator wireless communication packet networks RNET1 and RNET2.

The wireless communication terminal UA10 is connected to the operator wireless communication packet network RNET2. On the other hand, the wireless communication terminal UA20 waits on the operator wireless communication packet network RNET1. The operator wireless communication packet network RNET2 is a broader bandwidth network compared to the operator wireless communication packet network RNET1. The wireless communication terminal UA20 is a so-called multimode terminal that can be connected to a plurality of wireless communication networks. Here, for simplicity, it is assumed that the wireless communication terminal UA20 can be connected to the operator wireless communication packet network RNET1 and the operator wireless communication packet network RNET2. When the wireless communication terminal UA20 waits on the circuit switching network corresponding to the operator wireless communication packet network RNET1, it is not connected to a packet switching network of the operator wireless communication packet network RNET2 and is in an unconnected state (although the unconnected state is not necessarily required, here, an explanation is given on the above-mentioned conditions).

Here, in the case where the wireless communication terminal UA10 as an outgoing call/caller side (Calling Party) performs call of a real-time application service to the wireless communication terminal UA20 as an incoming call/callee side, the wireless communication terminal UA10 stores a preference for executing the real-time application by the wireless communication terminal UA20 in INVITE (connection initiation request) message of SIP and conveys it to the wireless communication terminal UA20. The preference used by embodiment 2 is the same as that of embodiment 1.

There are the following two kinds of methods to convey such preference to the wireless communication terminal UA20.

The first method is to define a new header and a parameter in SIP protocol in order for the wireless communication terminal UA20 to convey a preference (selection criteria) for selecting one wireless communication network from a plurality of wireless communication networks and connecting it by using SIP.

The second method is to notify the wireless communication terminal UA20 of the bandwidth specific to the application by using SDP (Session Description Protocol) of INVITE, and the wireless communication terminal UA20 selects the most suitable wireless communication network that meets the notified necessary bandwidth. In either case, a preference of the wireless communication terminal UA10 is notified by using SIP, and the SIP server of the operator of the wireless communication terminal UA20 includes the notified preference in the call request reception information and notifies the SIP server or a base station control apparatus or the like served as a paging control apparatus of it. The SIP server further includes the preference in a paging message and controls the subordinate base station control apparatus 800 and base station 900 so that notification is given to the wireless communication terminal UA20 through paging. Thus the wireless communication terminal UA20 can know the preference of the wireless communication terminal UA10. After that, the wireless communication terminal UA20 selects the most suitable wireless communication network based on the notified preference and connects to it, then after that, performs registration in the SIP server through the selected and connected most suitable wireless communication network.

Figure 16:
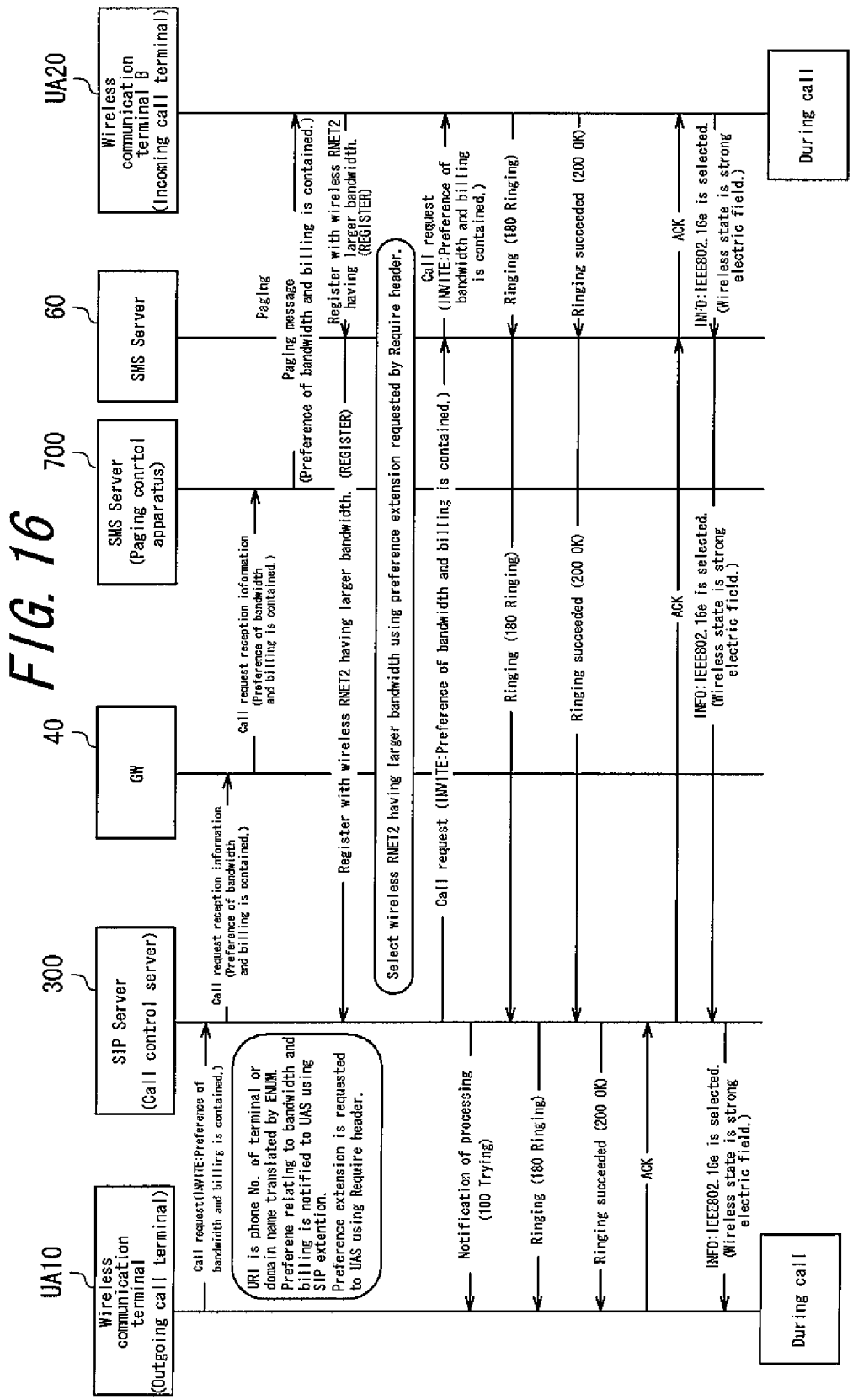
FIG. 16 is a sequence diagram in the case where communications are performed using wireless communication terminals subscribed to the same operator (wireless communication carrier)
Figure 17:
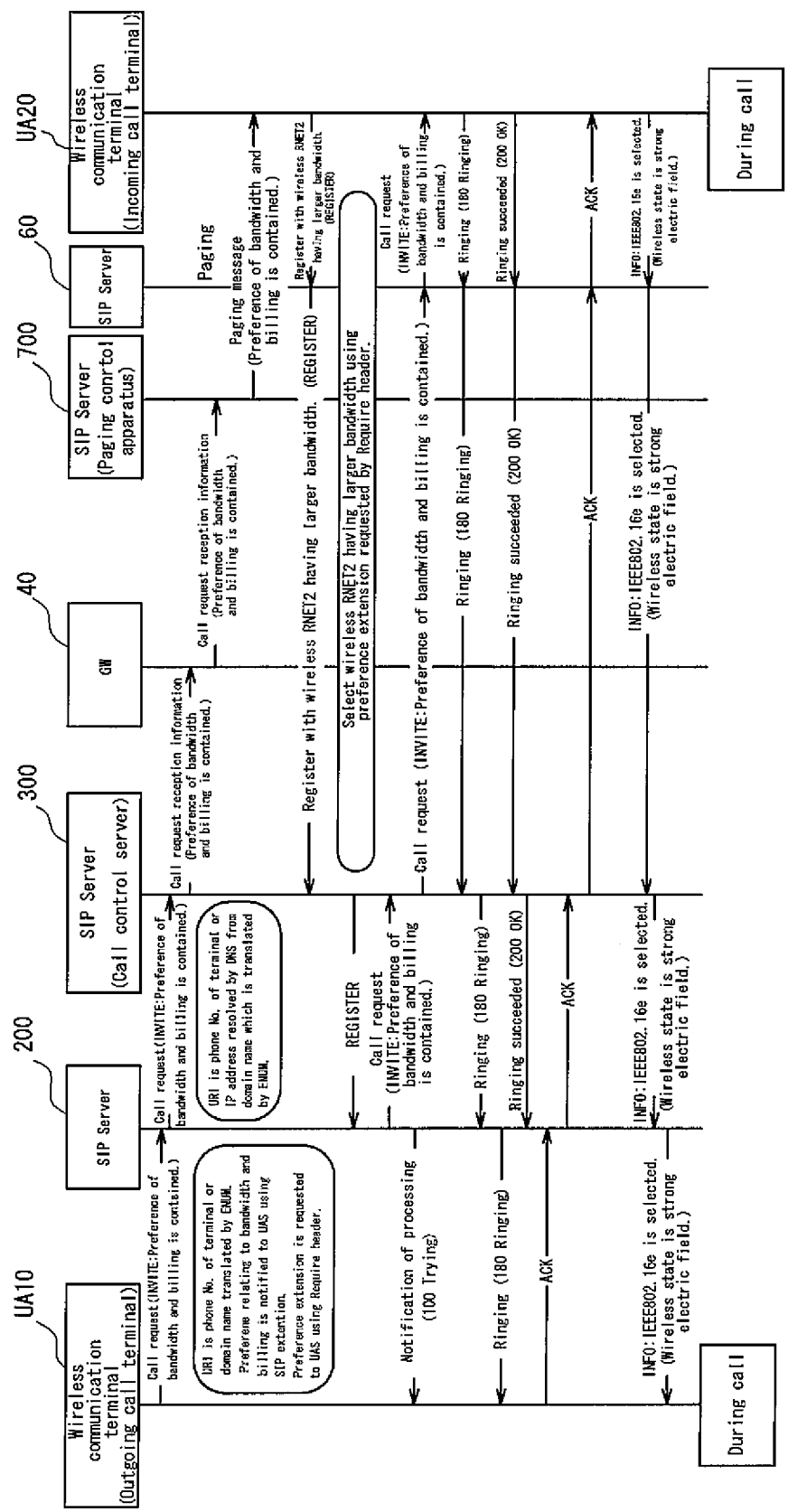
FIG. 17 is a sequence diagram in the case where communications are performed using terminals subscribed to different ISPs (Internet Service Providers)
Figure 18:
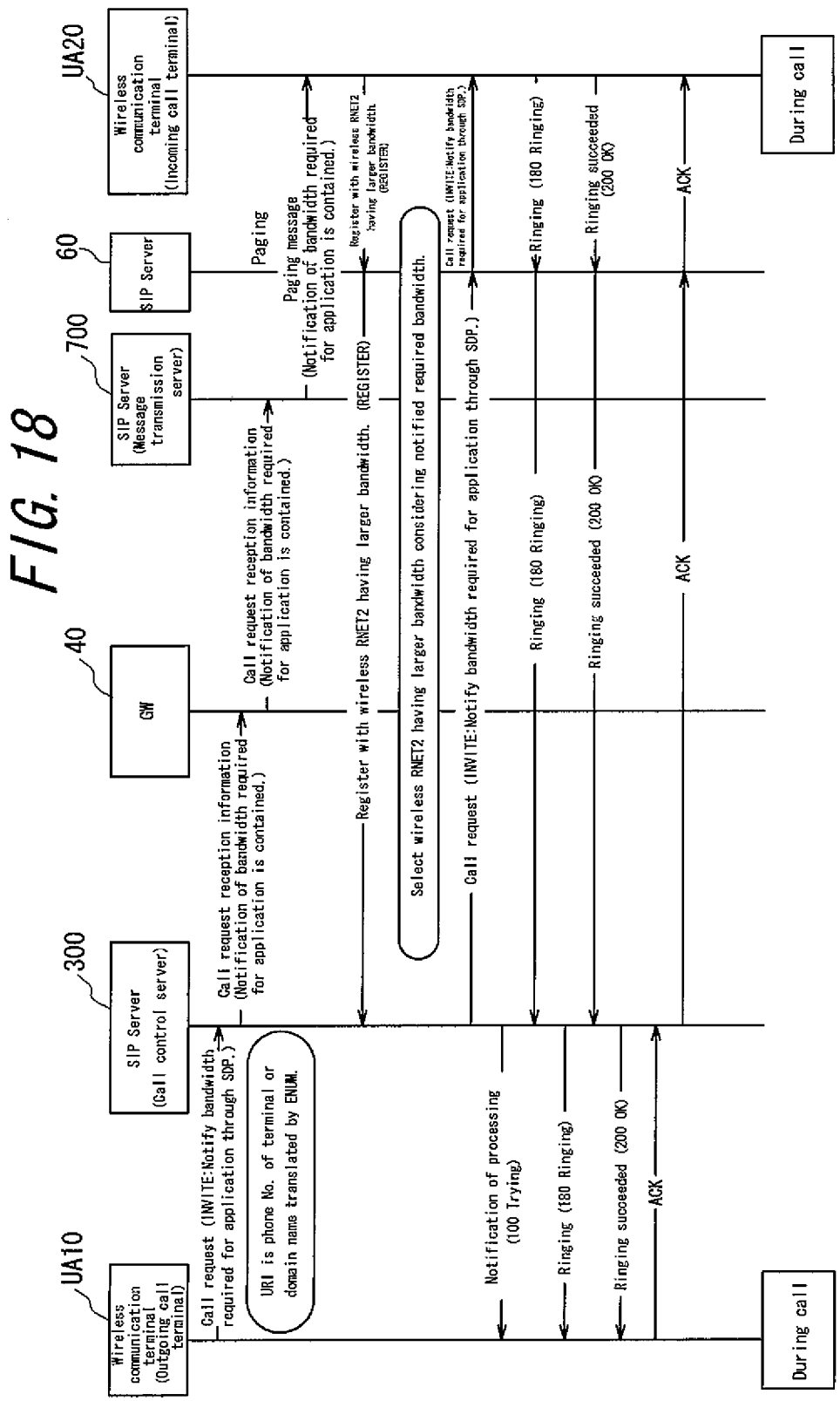
FIG. 18 is a sequence diagram in the case where communications are performed using wireless communication terminals subscribed to the same operator (wireless communication carrier)
Figure 19:
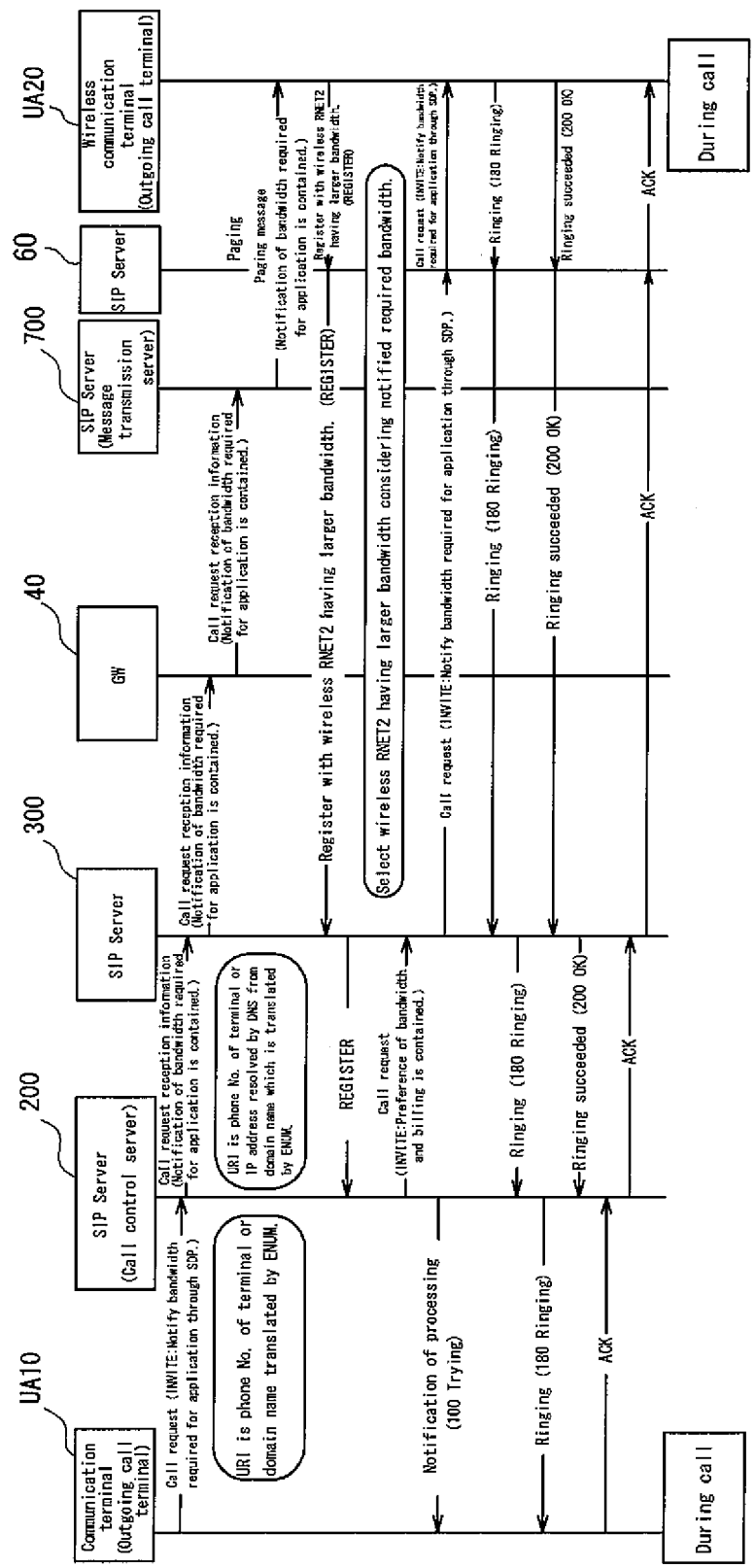
FIG. 19 is a sequence diagram in the case where communications are performed using terminals subscribed to different ISPs (Internet Service Providers)

FIGS. 16 and 18 are sequence diagrams in the case where communications are performed using wireless communication terminals subscribed to the same operator (wireless communication carrier). FIGS. 17 and 19 are sequence diagrams in the case where communications are performed using terminals subscribed to different ISPs (Internet Service Providers). FIG. 16 shows the case where a preference relating to bandwidth and billing (a preference relating to selection of a wireless communication network of the wireless communication terminal UA20) is conveyed by using the SIP extension when the wireless communication terminal UA10 transmits INVITE to the wireless communication terminal UA20 after registration in the SIP server 300. In this embodiment, the description example shown in embodiment 1 (FIG. 10) can be used as INVITE message. INVITE transmitted from the wireless communication terminal UA10 is notified by the registered SIP server 300 to the SIP server 700 through the GW40 of the operator as the call request information containing a preference relating to bandwidth and billing. The SIP server 700 controls the subordinate base station control apparatus 800 and base station 900 so that the notified preference is contained in a paging message, and the paging message is transmitted to the wireless communication terminal UA20. The wireless communication terminal UA20 performs, based on the content of the preference notified by the paging message, registration in the SIP server 300 through the most suitable wireless communication network. In the case of FIGS. 16~19, priority is given to bandwidth and registration is performed by the operator wireless communication packet network RNET2 having a larger bandwidth.

After that, a session (communication) is established between the wireless communication terminal UA10 and the wireless communication terminal UA20 in accordance with the SIP procedures, then the wireless communication terminal UA20 on the incoming call side notifies the wireless communication terminal UA10 on the outgoing call side of the name of the selected wireless communication network and its wireless state (radio wave strength) by using the INFO message extension. In this embodiment, the description example shown in embodiment 1 (FIG. 11) can be used as INFO message.

FIG. 17 is a sequence diagram showing the case where the wireless communication terminal UA20 performs communication with a terminal that uses an ISP which is different from that used by the wireless communication terminal UA20. In this case also, as in the case of FIG. 16, by using the SIP extension, a preference relating to bandwidth and billing is notified to the SIP server 200 of ISP (operator) of the wireless communication terminal UA20 through INVITE. INVITE containing the preference information is processed by redirecting from the SIP server 200 to the SIP server 300. In other words, in the present configuration, the SIP server 200 behaves as a conventional SIP server, and the SIP server 300 serves as a call control server that supports a new SIP format in accordance with the present invention. The following sequence is the same as that of FIG. 16.

FIGS. 18 and 19 are sequence diagrams where the SIP extension is not used. In this case, the wireless communication terminal UA10 or the communication terminal UA30 includes the bandwidth information of SDP in INVITE and transmits it to the wireless communication terminal UA20. In the same manner, the SDP bandwidth information is notified from the SIP server 300 to the SIP server 700 through the GW40 as the call request reception information. Then, the SIP server 700 controls the subordinate base station control apparatus 800 and base station 900 so that a paging message containing the bandwidth information as the preference information is notified to the wireless communication terminal UA200 through paging. In this case, there is no preference relating to billing, and the SMS server 500 notifies the wireless communication terminal UA20 of only necessary bandwidth of the application used by the terminal on the outgoing call side. Therefore, the wireless communication terminal UA20 performs registration in the SIP server 60 (or the SIP server 300) by using the most suitable wireless communication network that can stably meet the notified necessary bandwidth. When there is a plurality of wireless communication networks that meet the bandwidth conditions, it is preferable to select the wireless communication network whose communication fee is the least expensive.

FIG. 7 is a function block diagram of a SIP server (call control server). As shown in the figure, the SIP server 300 has a login (registration) processing unit 310, a call request reception unit 320, an address resolution processing unit 330, a call request generation unit 340 and a call request transmission unit 350. The login (registration) processing unit 310 receives a login (registration) request (Register) from a terminal and performs necessary processing. The call request reception unit 320 receives a call request (Invite message) containing the preference information of the outgoing call side and for calling the incoming call side. In order to convey the call request received by the call request reception unit 320 to the incoming call side, the call request generation unit 340 generates the call request reception information (Info message) containing the information indicating that the call request is received and the preference information contained in the call request, and the call request transmission unit 350 transmits the generated call request reception information (Info message) to the SIP server (or the base station control apparatus or the base station served as a paging control apparatus) served as a paging control apparatus.

Figure 20:
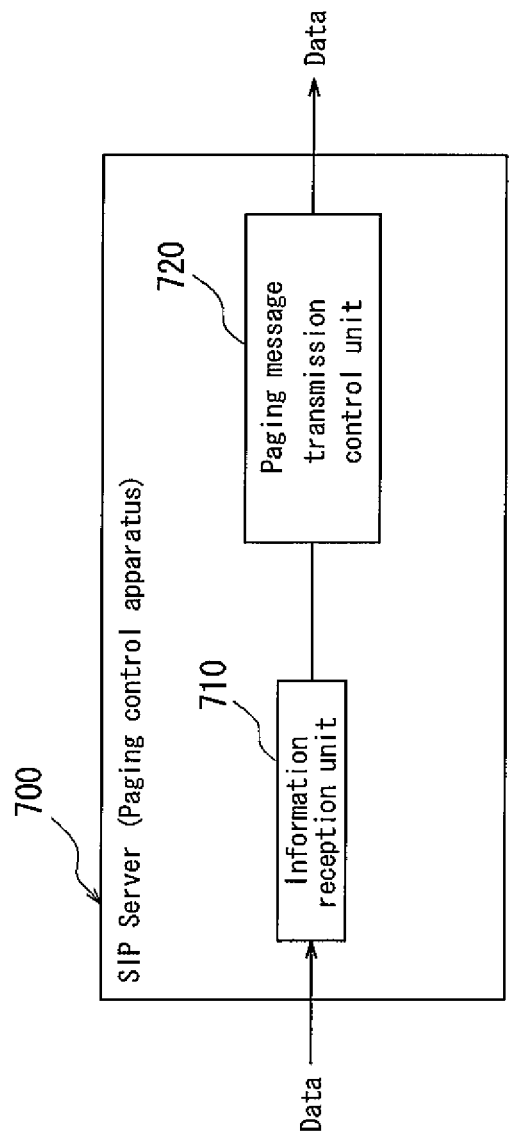
FIG. 20 is a function block diagram of a SIP server (a paging control apparatus)

FIG. 20 is a function block diagram of a SIP server (a paging control apparatus). As shown in the figure, the SIP server 700 has an information reception unit 710 and a paging message transmission control unit 720. The information reception unit 710 receives the call request reception information transmitted from another SIP server (a call control server). Based on the call request reception information received by the information reception unit 710, the paging message transmission control unit 720 includes the preference information contained in the call request reception information in a "paging request message" or the like that requests transmission of a "paging message" for activating communication with the outgoing call side and transmits it to the incoming call side. In this example, the SIP server 700 is cited as an example of paging control apparatus. However, it is possible to provide these information reception unit 710 and paging message transmission control unit 720 in a base station control apparatus, a base station and a PDSN (packet data service node, packet data exchange apparatus). Further, in FIGS. 15~18, for convenience of drawing and explanation, explanation is given as if the SIP server 700 served as a paging control apparatus transmits a paging message. However, as mentioned above, it should be noted that the actual paging message is transmitted by the subordinate base station.

In embodiment 2, the apparatuses, servers and components attached with the same codes as those of embodiment 1 are the same and have the same functions as those of embodiment 1. Thus, their explanations are omitted. Therefore, it should be noted that explanations of the same apparatuses and components are occasionally omitted in the following description of each embodiment. For example, the SIP server (call control server) 300 or the wireless communication terminal UA20 used by embodiment 2 has the same components and functions as those in embodiment 1. In embodiment 2, as in the case of embodiment 1, a display screen shown in FIGS. 12 and 13 is displayed on a communication terminal on the outgoing call side (Calling Party).

In embodiment 2, when transmission is performed from a (wired) multimedia terminal or a wireless communication terminal of the Internet to a so-called multimode terminal having a plurality of wireless communication devices, the incoming call side (user) selects, from the beginning, the most suitable wireless communication network for a preference relating to bandwidth or billing required for an application used by an outgoing call user and communication is established. For example, in the case where the outgoing call side user would like to perform communication with an incoming call user side user by using an application that requires a large bandwidth such as IP television phone, since the bandwidth required for the application can be conveyed to the incoming call side user at the stage of call establishment, it is possible to initiate communication by selecting a wireless communication network that is most suitable for the application from the beginning without using other wireless communication networks not suitable for the application. In addition, if the outgoing call side user places the most importance on inexpensive billing, it can be conveyed to the incoming call side user as the preference information at the stage of call establishment. Therefore, it is possible to initiate communication by selecting the most inexpensive wireless communication network from the beginning.

Embodiment 3

Before detailed explanations of embodiments 3 and 4 are given, a typical processing sequence of embodiments 3 and 4 is briefly explained.

(1) In the case where an incoming call of real-time application is received by a wireless communication terminal having a plurality of wireless communication network devices, the most suitable wireless communication network is selected by considering a required bandwidth for the application notified from a terminal on an outgoing call side, registration operation is performed in the SIP server and after that, communication state is brought about in accordance with the necessary SIP procedures. After that, in the case where the above-mentioned wireless communication terminal is obliged to perform handover to another wireless communication network due to move, it is conveyed to the application of the corresponding node (the corresponding party of the session) by using the abstract L2 (Layer 2) information (i.e. the wireless link information) relating to the handover by using SIP. It should be noted that the L2 information is not specific to wireless communication systems. The application can be used for any wireless communication networks. That is, the L2 information is the abstract information that is not dependent on a system, and there are some cases where the L2 information contains data that is a part of the L1 (Layer 1) information depending on the difference between the incoming call side and the outgoing call side.

(2) The abstract L2 information notified to the corresponding party in process (1) contains parameters such as bandwidth and delay characteristics (average delay, jitter or the like) which can be provided by the wireless communication network of the handover destination.

(3) The application of the corresponding party to which the L2 information has been notified in process (2) changes or prepares to change, in view of the notified bandwidth and delay characteristics, the coding scheme (codec), compression rate (codec rate), sampling rate, coding rate, frame rate, buffer (play buffer, jitter buffer) or the like of the application that is being executed currently to the appropriate values. In addition, the apparatus of the corresponding party to which the L2 information is notified may change the application itself. When the application is changed to that for bandwidth which is narrower than the current one, the notified corresponding party may change beforehand. In this case, the corresponding party performs negotiation with the wireless communication terminal to which the L2 information has been notified by using SIP. As a SIP message has a time-lag of 1~3 sec., it prevents deterioration of communication quality caused by notification through a SIP message after changing from a broad bandwidth to a narrow bandwidth. Further, on the contrary, in the case of handover from a narrow bandwidth to a broad bandwidth wireless communication network, deterioration of communication quality can be better prevented by notifying through a SIP message or by changing based on the notification after completing handover.

(4) In the case of handover to a narrow bandwidth wireless communication network in process (3), the handover is notified to the user through a user interface (UI) such as a display unit and a speaker at the corresponding party to allow selection among change of the coding scheme, type of codec, coding rate, frame rate or the like of the application to appropriate values, change of the application itself to another application for a narrow bandwidth and no change. Or a user policy may be registered beforehand.

(5) In the case of handover to a broad bandwidth wireless communication network in process (3), the handover is notified to the user through a user interface at the corresponding party to allow selection among change of the coding scheme, type of codec, coding rate, frame rate or the like of the application to appropriate values, change of the application itself to another application for a broad bandwidth and no change. Or a user policy may be registered beforehand.

(6) A wireless communication terminal having a plurality of wireless communication network devices notifies the application for the corresponding party (CN: Correspondence Node) of initiation of handover to another wireless communication network during communication by a real-time application through the wireless link information (abstract L2 information) by using SIP. The application of the corresponding party to which notification is made, considering the switching characteristics (required time for handover or the like) at the time of handover, prevents packet loss by temporarily increasing jitter buffers and buffers, which allows, finally, setting of jitter buffers and buffers by considering the bandwidth and the delay characteristics of the wireless communication network of the handover destination.

(7) A wireless communication terminal having a plurality of wireless communication network devices notifies the application for the corresponding party (CN) of completion of handover to another wireless communication network during communication by a real-time application through the wireless link information (abstract L2 information) by using SIP. The application of the corresponding party to which notification is made changes the jitter buffer and the buffer that are, increased temporarily to the size that is appropriate to the wireless communication network of the handover destination. In addition, in the case where the bandwidth of the wireless communication network after handover is broader, the coding scheme, coding rate and frame rate are changed to correspond to it. In the case where the priority of the preference (desired setting item) is given to bandwidth and handover is performed to a narrowband wireless communication network, if voice and image are used simultaneously in the application, it may be changed to the use of voice only.

(8) In a wireless communication terminal having a plurality of wireless communication network devices, in the case where a terminal UAS on the incoming call side has a communication means to connect to a circuit switching network, an SMS server to which the terminal UAS on the incoming call side belongs conveys, through SMS, the preference of the terminal UAC on the outgoing call side relating to a so-called policy such as to which the wireless communication terminal (UAS) on the incoming call side gives priority, "realization of a bandwidth required for the real-time application" or "the least expensive billing".

(9) In a wireless communication terminal having a plurality of wireless communication network devices, when its communication quality becomes equal to or below a certain reference value, the wireless link layer notifies the control unit for the wireless communication terminal of the wireless link information (the abstract L2 information) that is not dependent on a specific wireless communication network in order to prepare for handover to another wireless communication network. The wireless communication terminal control unit to which the notification is made activates another wireless communication network that is left to be in a sleep mode or unconnected and connects it to the wireless network. When the quality is equal to or above the certain reference value, at which preparation for so-called handover is initiated, another wireless communication device is left to be in a dormant mode or unconnected to avoid unnecessary battery consumption.

(10) In process (9), a wireless link layer of another new wireless communication network measures average delay and jitter that can be supplied by the wireless network by transmitting and receiving control messages and echo messages with the server and notifies the control unit for the wireless communication terminal of it, then further, estimates the bandwidth based on the acquired wireless information and notifies the control unit of the wireless communication terminal of it in the same manner. Thus the control unit for the wireless communication terminal can notify the application for the corresponding party of the estimated bandwidth, average delay and jitter of the wireless communication network of the handover destination by using SIP.

(11) The terminal (UAC: User Agent Client) on the outgoing call side performs negotiation with the SMS server or the SIP server (the closest to the incoming call terminal in metric) on a so-called policy such as which to give priority, "realization of a bandwidth required for a real-time application by the terminal (UAS: User Agent Server) on the incoming call side" or "the least expensive billing" and determines. The terminal UAC on the incoming call side can register a desired policy, for example, in the SMS server or the SIP server or the like beforehand.

Hereinafter embodiments will be described below in detail with reference to the drawings. As embodiment 3, a configuration that uses SMS for calling the corresponding party is described, and as embodiment 4, a configuration that uses paging for calling the corresponding party is described. The only difference between embodiments 3 and 4 is a configuration (a relay station, a server for conveying an activation message or the like) for establishing a SIP session. The functions of the wireless communication terminals on both ends are the same.

Figure 21:
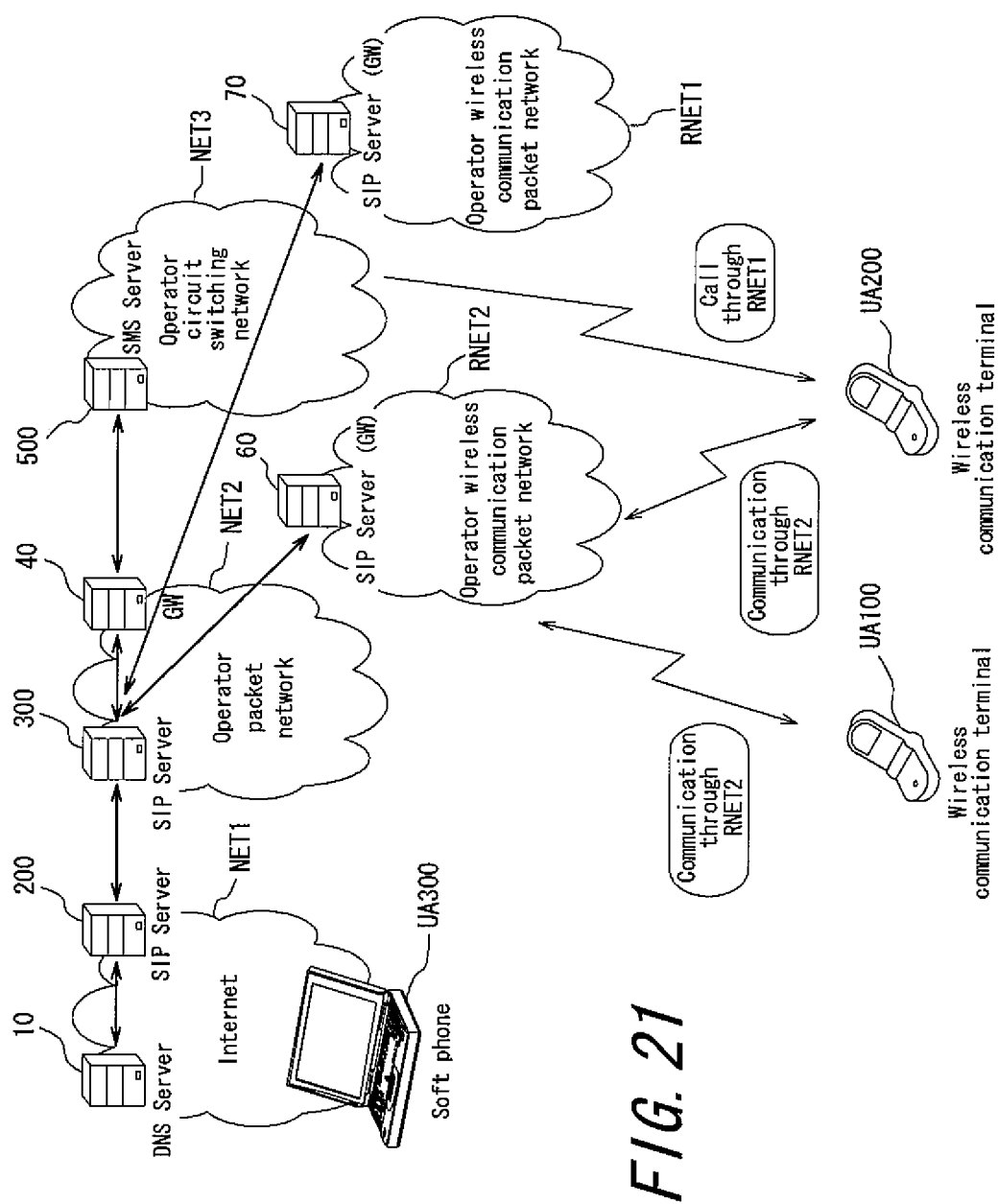
FIG. 21 is a wireless communication network block diagram in accordance with an embodiment of the present invention.

FIG. 21 is a wireless communication network block diagram in accordance with an embodiment of the present invention. As shown in the figure, as servers and gateways, there are a DNS server 10, a SIP server 200, a SIP server 300, a gateway (GW)40, an SMS server 500, a SIP server (or GW)60 and a SIP server (or GW)70. The SIP servers 200 and 300 serve as a call control server in accordance with the present invention, and the SMS server 500 serves as a message transmission server in accordance with the present invention. As a communication terminal and a soft phone on the outgoing call side and the incoming call side, there are a wireless communication terminal UA (User Agent)100, a UA200 and a communication terminal (soft phone) UA300. Each of these terminals is connected to the above-mentioned each server and GW through an Internet NET1, an operator packet network NET2, an operator circuit switching network NET3 and an operator wireless communication packet networks RNET1 and RNET2.

The wireless communication terminal UA 100 is connected to the operator wireless communication packet network RNET2. On the other hand, the wireless communication terminal UA200 can be connected to the operator wireless communication packet network RNET2. The operator wireless communication packet network RNET2 is a broader bandwidth network compared to the operator wireless communication packet network RNET1. The wireless communication terminal UA200 is a so-called multimode terminal that can be connected to a plurality of wireless communication networks. Here, for simplicity, it is assumed that the wireless communication terminal UA200 can be connected to the operator wireless communication packet network RNET1 and the operator wireless communication packet network RNET2. When the wireless communication terminal UA200 waits on the circuit switching network corresponding to the operator wireless communication packet network RNET1, it is not connected to a packet switching network of the operator wireless communication packet network RNET1 and a packet switching network of the operator wireless communication packet network RNET2 and is in an unconnected state.

Here, in the case where the wireless communication terminal UA100 as an outgoing call/caller side (Calling Party) performs call of a real-time application service to the wireless communication terminal UA200 as an incoming call/callee side, the wireless communication terminal UA 100 stores a preference for executing the real-time application by the wireless communication terminal UA200 in INVITE (connection initiation request) message of SIP and conveys it to the wireless communication terminal UA200. The preference used by embodiment 3 is the same as that of embodiment 1.

There are the following two kinds of methods to convey such preference to the wireless communication terminal UA200.

The first method is to define a new header and a parameter in SIP protocol in order for the wireless communication terminal UA100 to convey a preference (selection criteria) to UA200 for selecting and connecting one wireless communication network from a plurality of wireless communication networks.

The second method is to notify the wireless communication terminal UA200 of the bandwidth that is specific to the application by using SDP (Session Description Protocol) of INVITE, and the wireless communication terminal UA200 selects the most suitable wireless communication network that meets the notified necessary bandwidth. In either case, a preference of the wireless communication terminal UA100 is notified by using SIP, and the SIP server of the operator of the wireless communication terminal UA200 includes the notified preference in the call request reception information and notifies the SMS server of it. The SMS server further includes the preference in an activation message (for promoting connection to a packet network and registration in the SIP server) that activates the application on the incoming call side and notifies the wireless communication terminal UA200 of it through SMS (Short Message Service) message. Thus the wireless communication terminal UA200 can know the preference of the wireless communication terminal UA100. After that, the wireless communication terminal UA200 selects the most suitable wireless communication network based on the notified preference, and after connection, registration in the SIP server is performed through the selected and connected most suitable wireless communication network.

Figure 22:
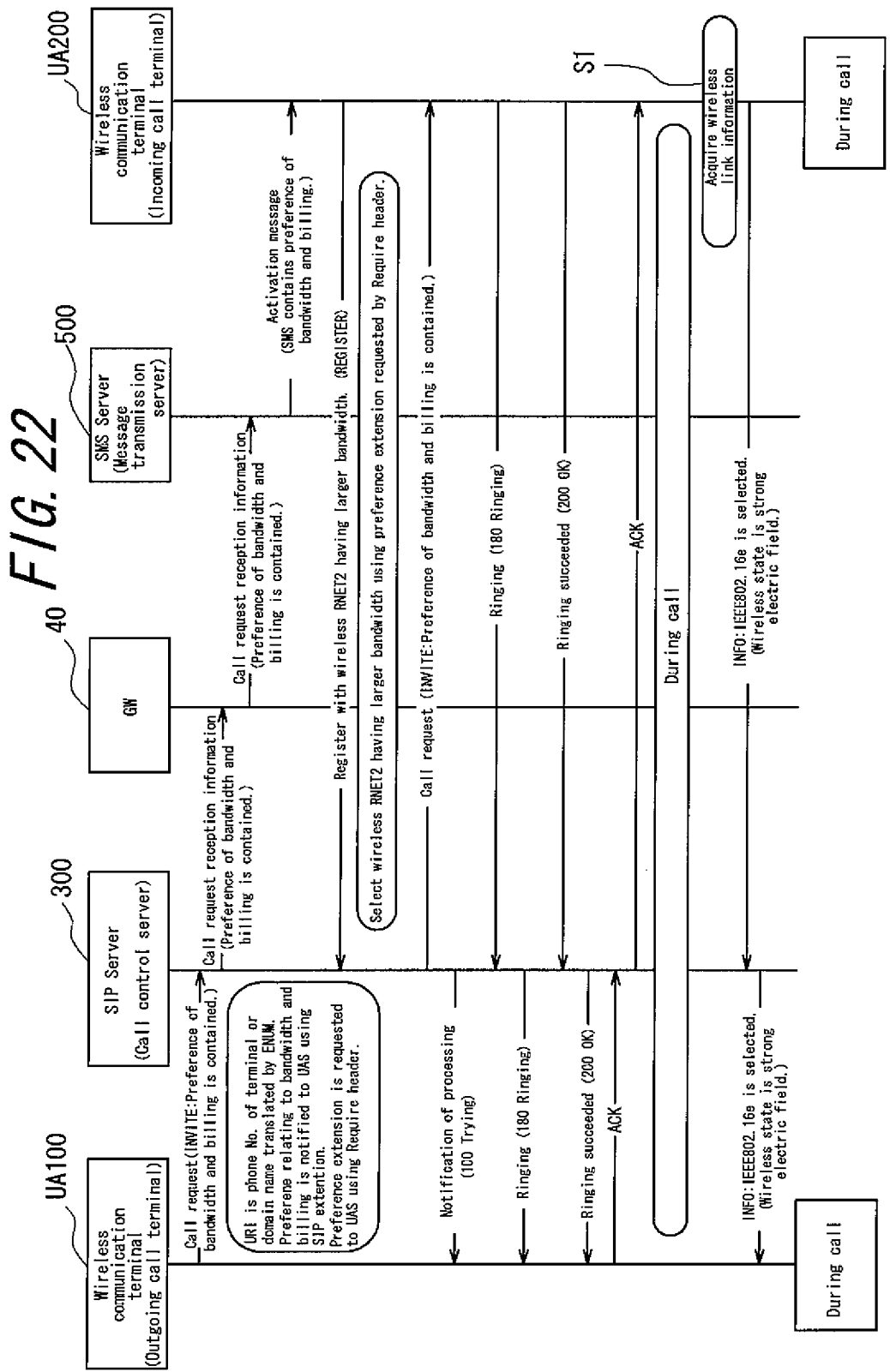
FIG. 22 is a sequence diagram in the case where communications are performed using wireless communication terminals subscribed to the same operator (wireless communication carrier)
Figure 23:
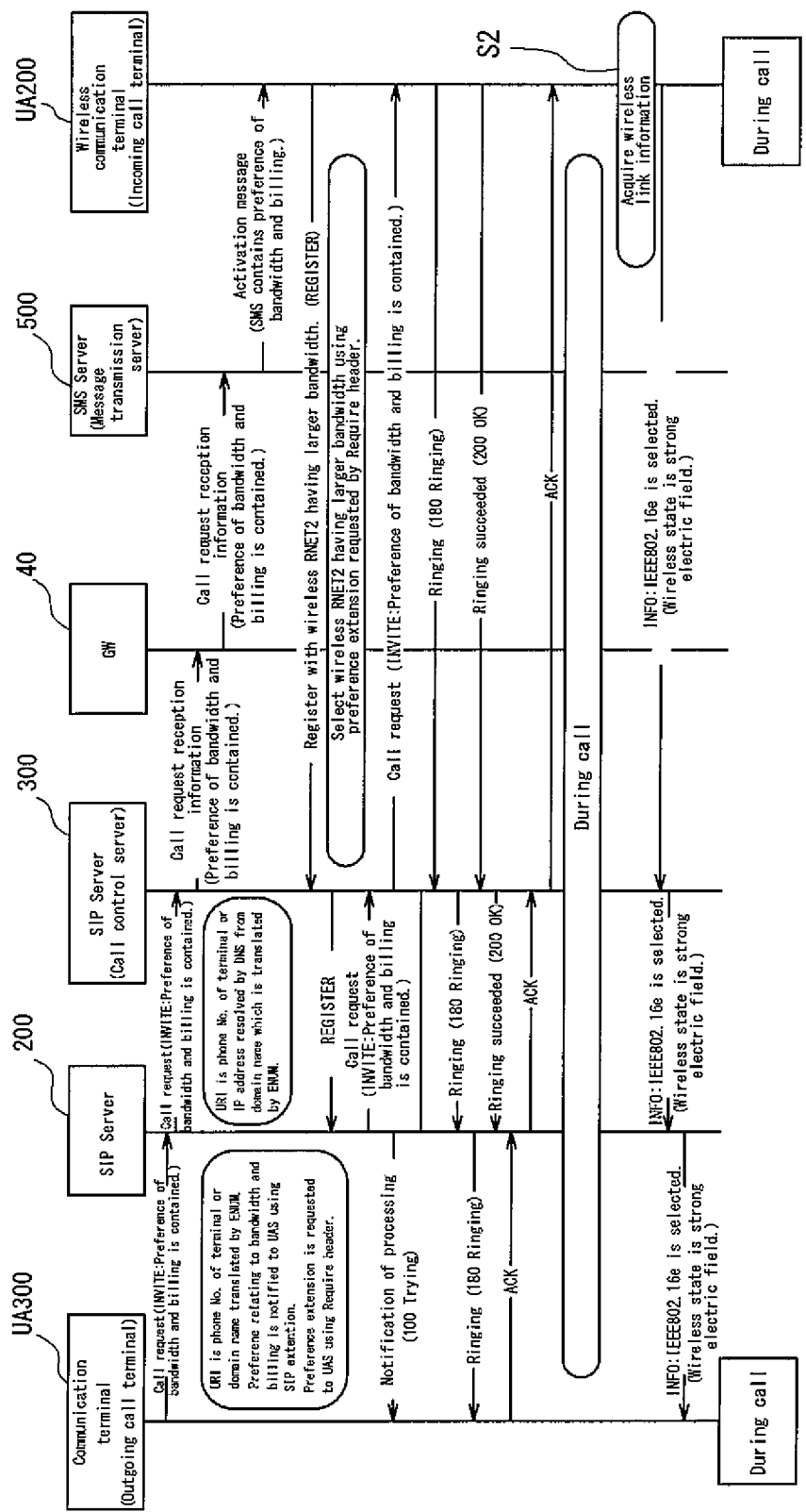
FIG. 23 is a sequence diagram in the case where communications are performed using terminals subscribed to different ISPs (Internet Service Providers)
Figure 24:
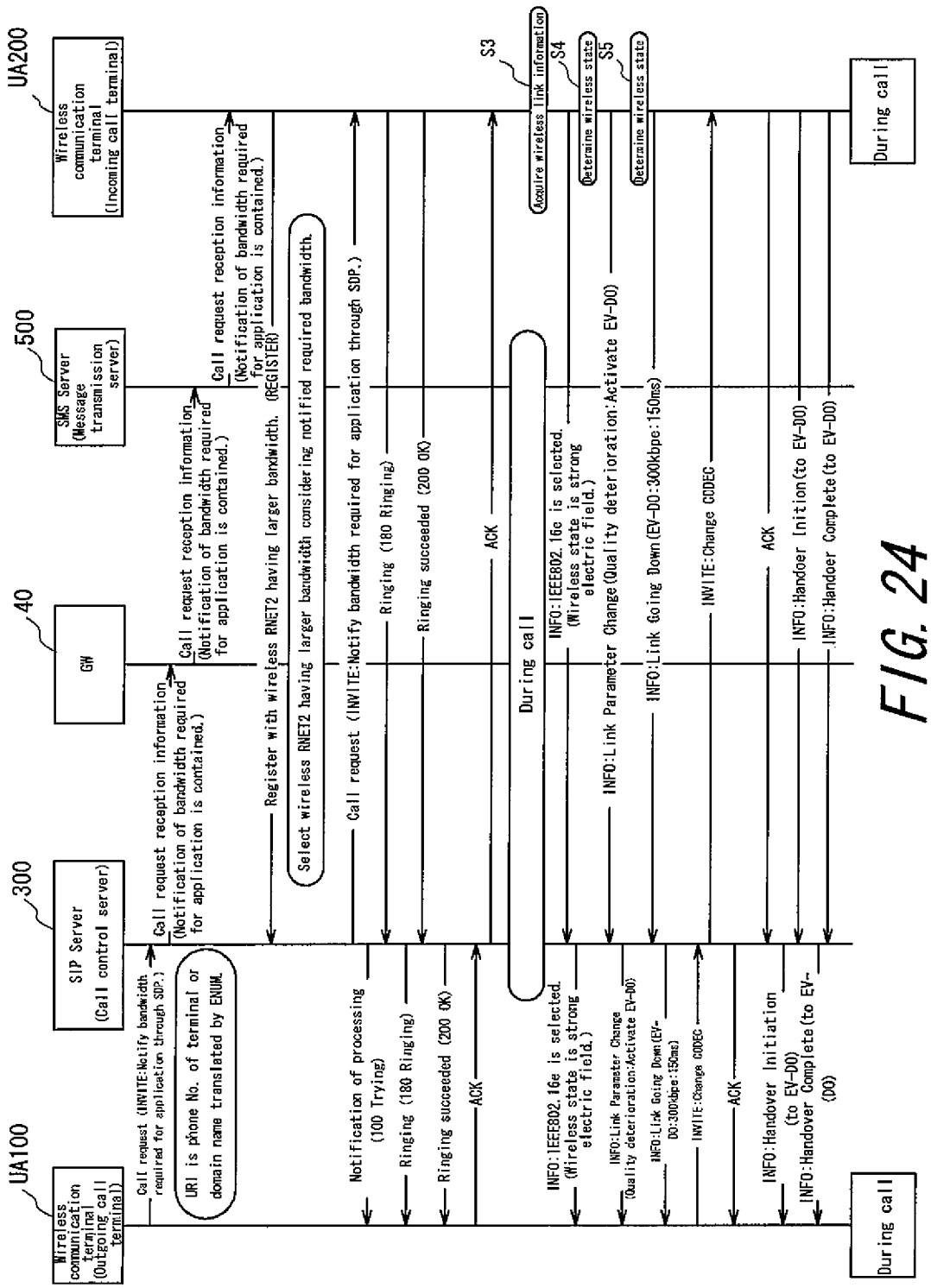
FIG. 24 is a sequence diagram in the case where communications are performed using wireless communication terminals subscribed to the same operator (wireless communication carrier)
Figure 25:
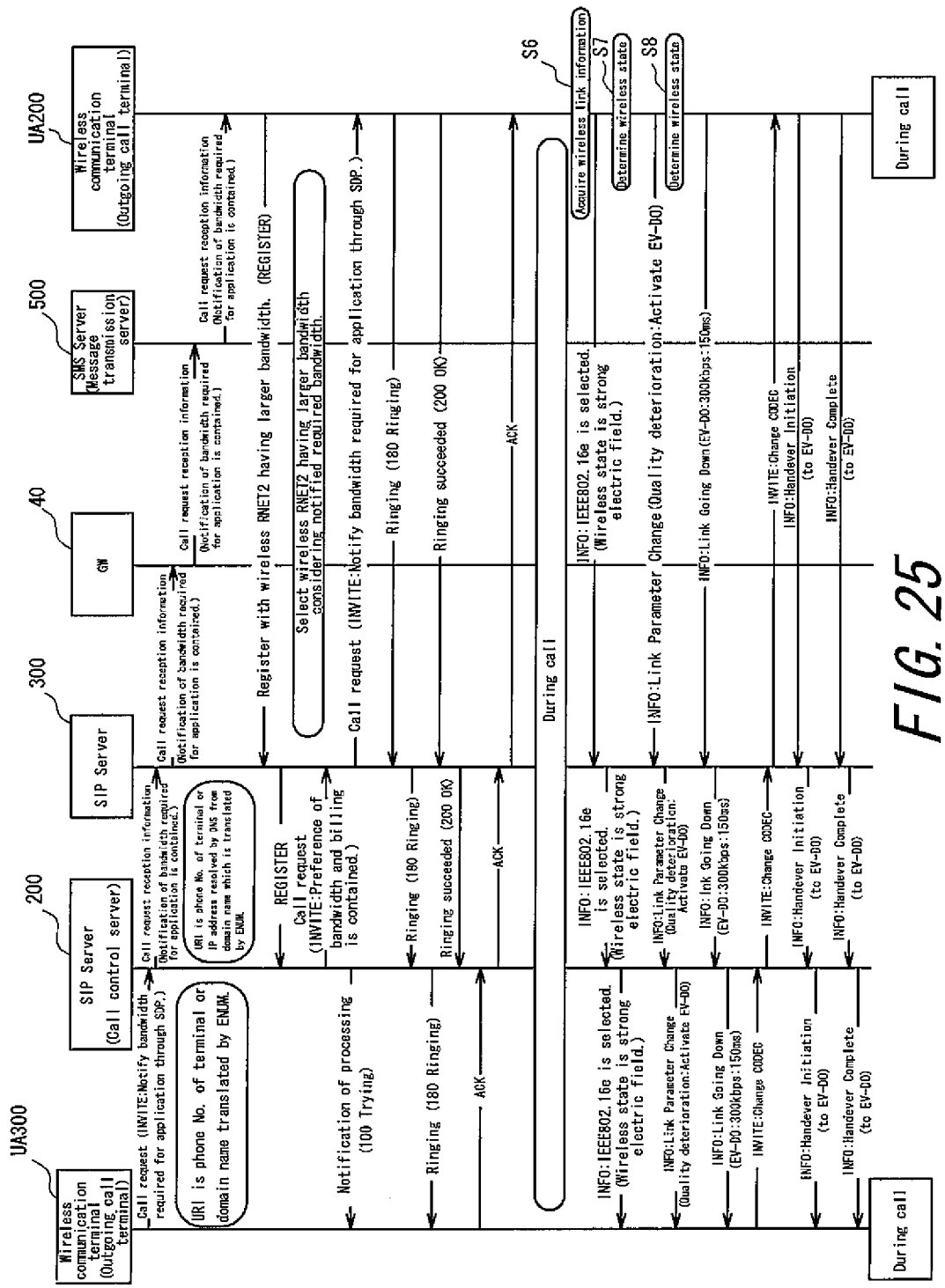
FIG. 25 is a sequence diagram in the case where communications are performed using terminals subscribed to different ISPs (Internet Service Providers)

FIGS. 22 and 24 are sequence diagrams in the case where communications are performed using wireless communication terminals subscribed to the same operator (wireless communication carrier). FIGS. 23 and 25 are sequence diagrams in the case where communications are performed using terminals subscribed to different ISPs (Internet Service Providers). FIG. 22 shows the case where a preference relating to bandwidth and billing (a preference relating to selection of a wireless communication network of the wireless communication terminal UA200) is conveyed by using the SIP extension when INVITE is transmitted to the wireless communication terminal UA200 after registration in the SIP server 300 by the wireless communication terminal UA100. In this embodiment, for INVITE message, a description example (FIG. 10) shown in embodiment 1 can be used. INVITE transmitted from the wireless communication terminal UA100 is notified by the registered SIP server 300 to the SMS server 500 through the GW40 of the operator as the call request information containing a preference relating to bandwidth and billing. The SMS server 500 includes the notified preference in SMS and transmits an activation message (SMS message) to the wireless communication terminal UA200 through the circuit switching network. The wireless communication terminal UA200 performs, based on the content of the preference notified by the SMS, registration in the SIP server 300 through the most suitable wireless communication network. In the case of FIGS. 22~25, priority is given to bandwidth and registration is performed by the operator wireless communication packet network RNET2 having a larger bandwidth.

After that, a session (communication) is established between the wireless communication terminal UA100 and the wireless communication terminal UA200 in accordance with the SIP procedures, then the wireless communication terminal UA200 on the incoming call side notifies the wireless communication terminal UA100 on the outgoing call side of the name of selected wireless communication network and its wireless state (RSSI: Received Signal Strength Indicator) by using the INFO message extension. In this embodiment, for INFO message, a description example (FIG. 11) shown in embodiment 1 can be used. In FIG. 22, the wireless communication terminal UA200, which is an incoming call terminal, acquires RSSI as the wireless link information (step S1), stores the acquired information and the selected wireless communication scheme (in this case, strong electric field and IEEE802.16e are selected) in INFO message and transmits it to the wireless communication terminal UA100, which is an outgoing call terminal. In the same manner, in FIG. 23, the wireless communication terminal UA200, which is an incoming call terminal, acquires received power (showing RSSI) as the wireless link information (step S2), stores the acquired information and the selected wireless communication scheme in INFO message, and transmits it to the wireless communication terminal UA100, which is an outgoing call terminal.

FIGS. 24 and 25 are sequence diagrams where the SIP extension is not used. In this case, the wireless communication terminal UA100 or the communication terminal UA300 includes the bandwidth information of SDP in INVITE and transmits it to the wireless communication terminal UA200. In the same manner, the SDP bandwidth information is notified from the SIP server 300 to the SMS server 500 through the GW40 as the call request reception information. Then, the SMS server 500 notifies the wireless communication terminal UA200 of an activation message containing the bandwidth information as the preference information. In this case, there is no preference relating to billing, and the SMS server 500 notifies the wireless communication terminal UA200 of only a necessary bandwidth of the application used by the terminal on the outgoing call side. Therefore, the wireless communication terminal UA200 performs registration in the SIP server 300 (in the case of the same operator) by using the most suitable wireless communication network that can stably meet the notified required bandwidth. When there is a plurality of wireless communication networks that meet the bandwidth conditions, it is preferable to select the wireless communication network whose communication fee is the least expensive.

In FIG. 24, right after communication (session) is initiated, in step S3, the wireless communication terminal UA200, which is an incoming call terminal, acquires RSSI as the wireless link information, stores the acquired information and the selected wireless communication scheme (in this case, strong electric field as the wireless state and IEEE802.16e are selected) in INFO message and transmits it to the wireless communication terminal UA100, which is an outgoing call terminal. After that, during call, the wireless communication terminal UA200 may monitor the radio state periodically and transmit the monitoring result (the wireless link information) to the wireless communication terminal UA100. Then, when it is determined that the periodically monitored wireless state has been deteriorated (which is equal to or below the quality level 1) (step S4), the wireless communication terminal UA200 activates the wireless communication network RNET1 (EV-DO), which is another wireless communication network and establishes a wireless link. At that time, the wireless communication terminal UA200 notifies the wireless communication terminal UA100, which is the corresponding party, of the L2 information event (the wireless link information) of "Link_Parameter_Change" through INFO message by using the SIP extension at the same time to notify the application for the wireless communication terminal UA100 that the wireless communication terminal UA200 has initiated preparation for handover from the wireless communication network RNET 2 to the wireless communication network RNET1. After that, in step S5, when the communication quality of the wireless communication terminal UA200 in the wireless communication network RNET2 is further deteriorated and becomes equal to or below the quality level 2, the wireless communication terminal UA200 notifies the application for the wireless communication terminal UA100, which is an outgoing call terminal, of the L2 information event (the wireless link information) of "Link_Going_Down" containing the average delay time (150 ms), jitter, expected bandwidth (300 kbps) or the like of the handover destination by using the SIP extension in the same manner.

Here, the wireless communication terminal UA100 learns that the wireless communication network RNET1 of the handover destination is a network whose bandwidth is narrower than that of the wireless communication network RNET2 that is currently used by the wireless communication terminal UA200 and queries the wireless communication terminal UA200 through INVITE in order for the application to change to the codec for a narrower bandwidth suitable for the notified bandwidth and delay characteristics (in this case, application is VoIP) beforehand. The wireless communication terminal UA200 notifies the application for the wireless communication terminal UA100 of acknowledgement of the notification of codec change by "ACK" (acknowledgement). In response to this, the wireless communication terminals UA100 and UA200 change codec (or change of codec rate and setting values for codec processing) at the same time. FIG. 25 is a sequence diagram in the case where communication is performed by terminals subscribed to different ISPs (Internet Service Providers). However, the wireless link information is conveyed to the wireless communication terminal UA100 on the caller side triggered by steps S6, S7 and S8 that are the same process as steps S3, S4 and S5 of FIG. 24.

Figure 26:
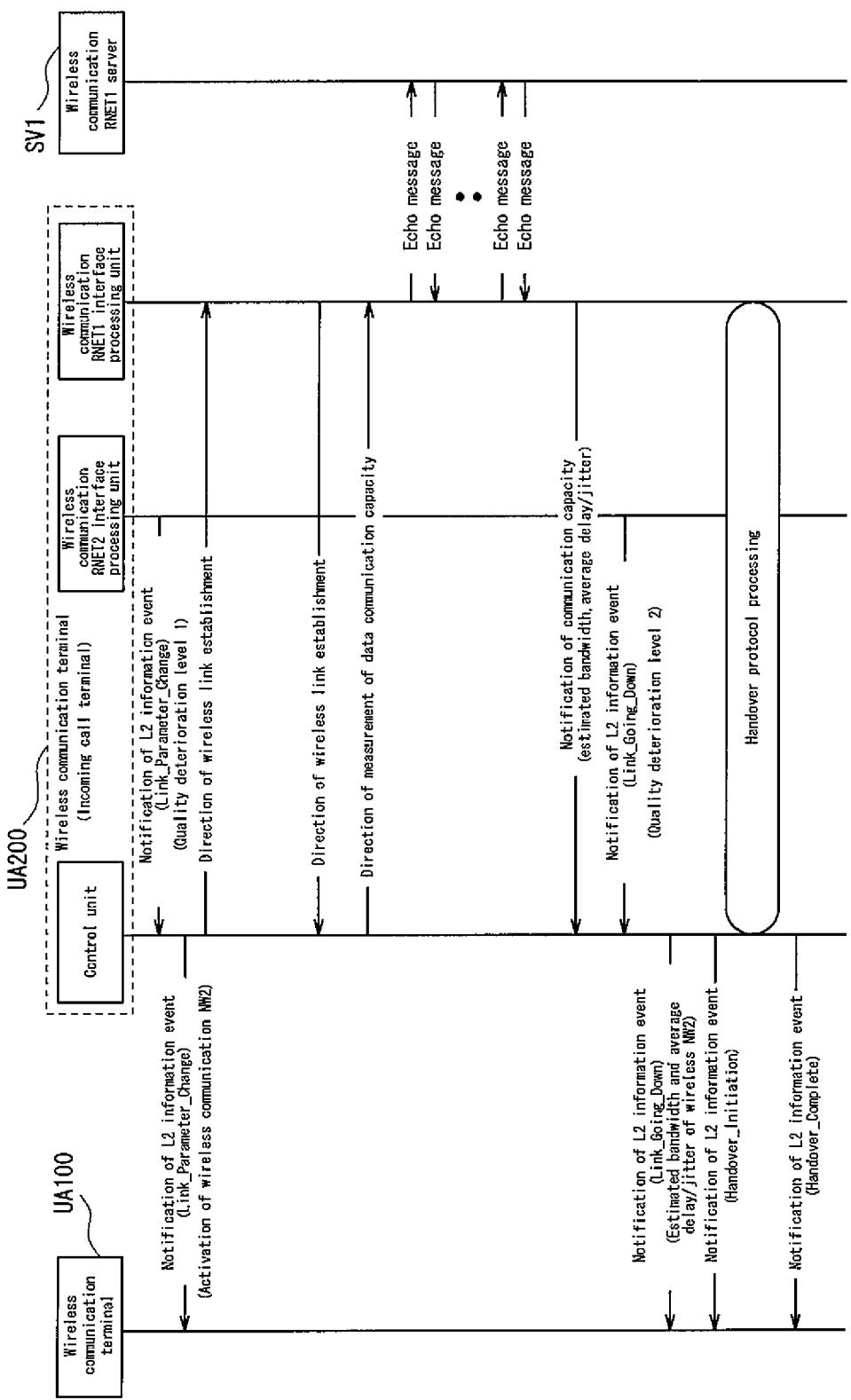
FIG. 26 is an internal process sequence diagram in the case where a wireless communication terminal UA200 has a link with both wireless communication networks RNET1 and RNET2.

FIG. 26 is an internal process sequence diagram where the wireless communication terminal UA200 has a link with both the wireless communication networks RNET1 and RNET2. In other words, it is a sequence diagram just before handover. As shown in FIG. 26, after a link is established with the wireless communication network RNET1, the wireless communication terminal UA200 measures the current average delay and jitter of the wireless communication network RNET1 by transmitting echo messages to the server SV1 through the wireless communication network RNET1 and at the same time, estimates the bandwidth based on the radio information (RSSI, CIR or the like) acquired by the wireless communication network RNET1.

"The abstract L2 information event of Link_Parameter_Change" informing that the quality has become equal to or below the quality deterioration level 1 is notified from the wireless communication RNET2 interface processing unit to the control unit. The control unit directs the wireless communication RNET1 interface processing unit to establish a wireless link to initiate preparation for handover and at the same time, notifies the wireless communication terminal UA100 of the L2 information event notification ("Link_parameter_Change").

In order to save the battery of the wireless communication terminal UA200, the device of the wireless communication network RNET1 is left to be in a sleep mode (a dormant mode) or unconnected unless the communication quality of the wireless communication network RNET2 becomes equal to or below the quality deterioration level 1. When the wireless link is established, the wireless communication RNET1 interface processing unit transmits a wireless link establishment notification to the control unit. In response to this, the control unit transmits a data communication capacity measurement direction to the wireless communication RNET1 interface processing unit. The wireless communication RNET1 interface processing unit performs communication of echo messages with the server on the wireless communication network RNET1 and measures the average delay and jitter, and further, estimates the bandwidth of the wireless communication network RNET1 based on the acquired wireless information (RSSI, CIR or the like). After that, the wireless communication RNET1 interface processing unit notifies the control unit of the average delay, jitter and estimated bandwidth. In the wireless communication network RNET2, when the communication quality is further deteriorated (equal to or below the quality level 2), the wireless communication RNET2 interface processing unit notifies the control unit of the L2 information event of "Link_Going_Down". The control unit notifies the wireless communication terminal UA100 of the L2 information event of "Link_going_Down" containing the estimated bandwidth, average delay and average jitter of the wireless communication network RNET1 of the handover destination. After that, the control unit activates the handover processing to the wireless communication network RNET1 and notifies the wireless communication terminal UA100 of the L2 information event of "Handover_Initiation". At the time when the handover to the wireless communication network RNET1 is completed, the control unit notifies the wireless communication terminal UA100 of the L2 information event of "Handover_Complete". As a bandwidth estimation method, the known method as shown below is used.

<Bandwidth Estimation Method>

For example, in the case where CDMA2000 1xEV-DO is used as a wireless communication network, calculation is made as follows;

<Upward Estimated Average Bandwidth>

Upward estimated average bandwidth is calculated by averaging the collected maximum transmission rates that are converted from the average RSSI based on the monitoring for the past T2 seconds at a cycle of T3 ms.

<Downward Estimated Average Bandwidth>

Based on the average DRC (Data Rate Control) monitored at a cycle of T3 ms, the average DRC for the past T2 seconds is calculated. Then based on the DRC, the downward estimated average bandwidth is calculated.

Back to the explanation of FIG. 24, the wireless communication terminal UA200 initiates handover to the wireless communication network RNET1 and at the same time, notifies the application for the wireless communication terminal UA100 of the L2 information event of "Handover_Initiation" (initiation of handover to EVDO) by using the SIP extension in the same manner. In response to this, the wireless communication terminal UA100 can prevents packet loss by increasing the capacity of jitter buffer temporarily during the handover processing.

After that, when the wireless communication terminal UA200 completes the handover to the wireless communication network RNET1, the wireless communication terminal 200 notifies the application for the wireless communication terminal UA100 of the L2 information event of "Handover_Complete" by using the SIP extension in the same manner as the application for the wireless communication terminal UA100. In response to this, since the average delay and jitter of the wireless communication network RNET1 are known due to an advance notice, the wireless communication terminal UA100 can reset the jitter buffer which was temporarily made larger to the size appropriate to the wireless communication network RNET1. Other than the change of codec during handover, in the case where the variable bit rate (VBR) codec is used, the rate can be changed gradually (in this case, the rate is decreased due to handover to a narrowband network).

In addition, when the application is IP TV phone, the video codec and voice codec can be changed to those for narrowband based on the bandwidth and jitter of the wireless communication network RNET1, and in an extreme case, transmission and reception of video may be discontinued and only the traffic of voice may be processed by the application.

The SIP server (call control server) 300 and the SMS server (message transmission server) 500 used by embodiment 3 have the same components as those of embodiments 1 and 2 and function almost in the same manner except the following. In this embodiment, the call request transmission unit 350 transmits the generated call request information (INFO message) to the SIP server served as a paging control apparatus (or base station control apparatus and base station served as a paging control apparatus) or an SMS server.

Figure 27:
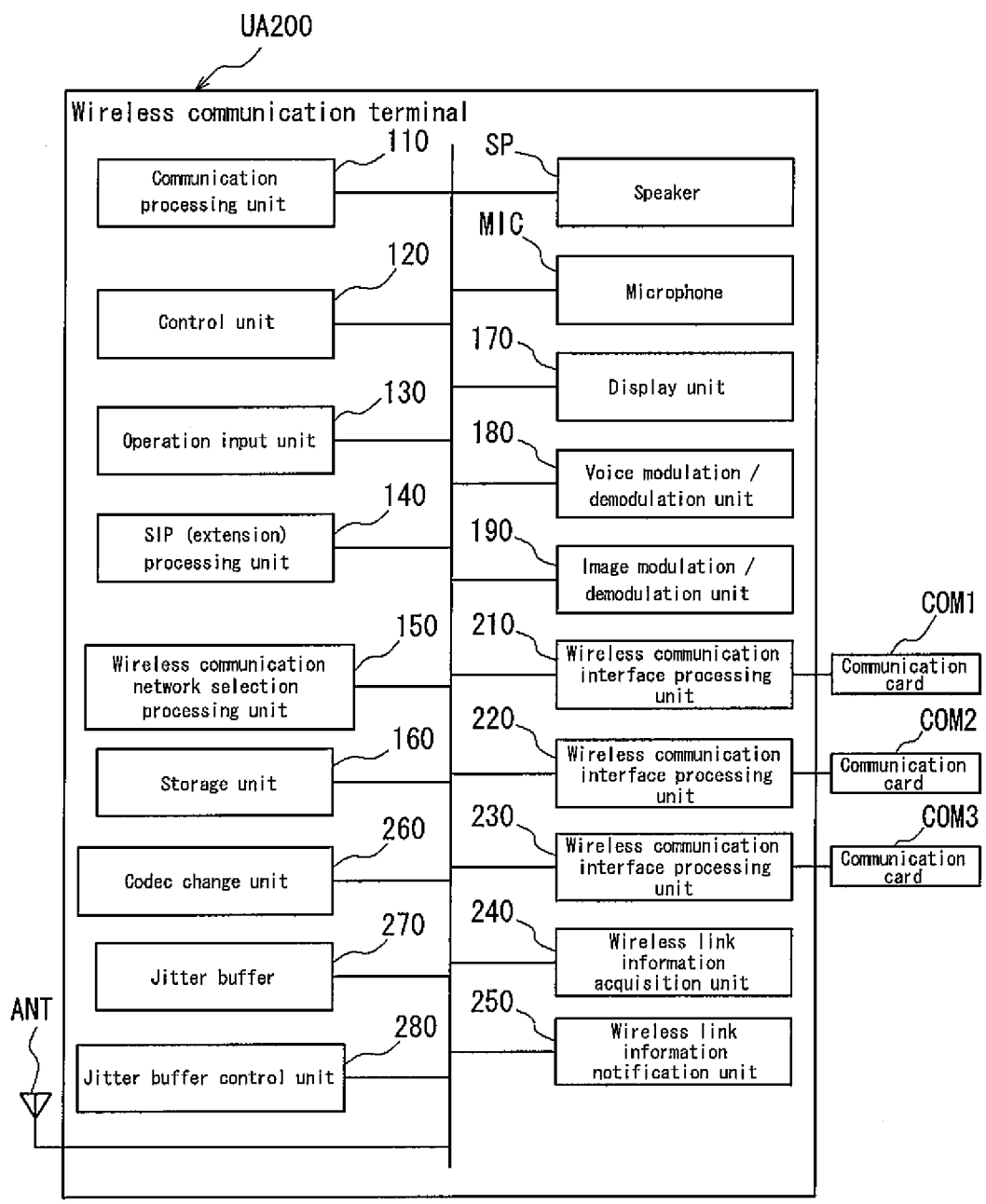
FIG. 27 is a function block diagram of a wireless communication terminal.

FIG. 27 is a function block diagram of a wireless communication terminal. As shown in the figure, the wireless communication terminal UA200 has a communication processing unit 110, a control unit (CPU, processor) 120, an operation (preference) input unit 130, a SIP (extension) processing unit 140, a wireless communication network selection processing unit 150, a storage unit 160, a speaker SP, a microphone MIC, a display unit 170, a voice modulation/demodulation unit 180 and an image modulation/demodulation unit 190. The wireless communication terminal UA200 further has three wireless communication interface processing units 210, 220 and 230 and an antenna ANT. To each of the wireless communication interface processing units 210, 220 and 230, communication cards COM1, COM2 and COM3 having a function to connect to different wireless communication networks respectively are attached. It should be noted that the wireless communication means is not limited to such an external connection type, and may be a built-in type. In addition, the wireless communication terminal UA200 further comprises a wireless link information acquisition unit 240, a wireless link information notification unit 250, a codec change unit 260, a jitter buffer 270 and a jitter buffer control unit 280. The wireless link information acquisition unit 240 acquires the wireless link information by echo command or the like, and the wireless link information notification unit 250 notifies the corresponding party of the acquired wireless link information. The codec change unit 260 performs codec change processing based on the bandwidth information and codec change information contained in the wireless link information. The jitter buffer 270 is a buffer for absorbing jitters by accumulating received packets to some extent so VoIP (RTP) packet can be played at the normal frame period, and the jitter buffer control unit controls, based on the jitter information or the like, to increase and decrease the buffer size at the time of handover and to change to the buffer size appropriate to the wireless communication network after handover.

Further, the control unit 120 serves as a call detection unit for detecting a call to the own apparatus and an incoming call detection unit for selecting, when a call to the own apparatus is detected by the call detection unit, one wireless communication system and detecting an incoming call corresponding to the call by the selected wireless communication system.

In addition, as mentioned above, in embodiment 3, the description examples (FIGS. 10 and 11) of INFO message and INVITE message shown in embodiment 1 can be used.

FIG. 28 shows an example of extended INVITE message format of SIP supported by a communication apparatus such as a wireless communication terminal, a communication terminal, a SIP server or the like in accordance with an embodiment of the present invention. As shown in the figure, change of codec to EVRC (Enhanced Variable Rate Codec) and rate 8 kbps is notified to the corresponding terminal by inserting m=audio 49170 RTP/AVP 96 and a=rtpmap<EVRC/8000 into INVITE message. Use of such SIP message format, as in the present invention, enables transmission of codec change to the corresponding terminal and codec change by synchronization.

FIG. 29 is a diagram showing an example of extended INFO message format of SIP supported by a communication apparatus such as a wireless communication terminal, a communication terminal, a SIP server or the like in accordance with the present invention. As shown in the figure, in order to convey the L2 information (the wireless link information), a "L2_Information_Event" header is introduced to INFO message. As the values of "L2_information_Event" header field, other than Link_Going_Down which conveys deterioration of the radio state of the wireless link (in other words, right before initiation of handover), there is the information relating to the wireless network such as the wireless communication network name, bandwidth, delay time or the like of the handover destination. Introduction of such new SIP message format allows conveyance of the wireless link information to the corresponding terminal as in the present invention.

FIG. 30 is a diagram showing an example of a display screen of the communication terminal for promoting policy selection relating to the application associated with handover. As shown in the figure, the policy at the time of handover is displayed on the screen as five options. The user points and selects one desired one from the five options, which is stored in a predetermined memory unit and is referred at the time of handover. Thus a process corresponding to the selected/set policy is selected.

As in the case of embodiment 1, the display screen shown in FIGS. 12 and 13 is displayed on the communication terminal on the outgoing call side (Calling Party) in embodiment 3.

Embodiment 4

Figure 31:
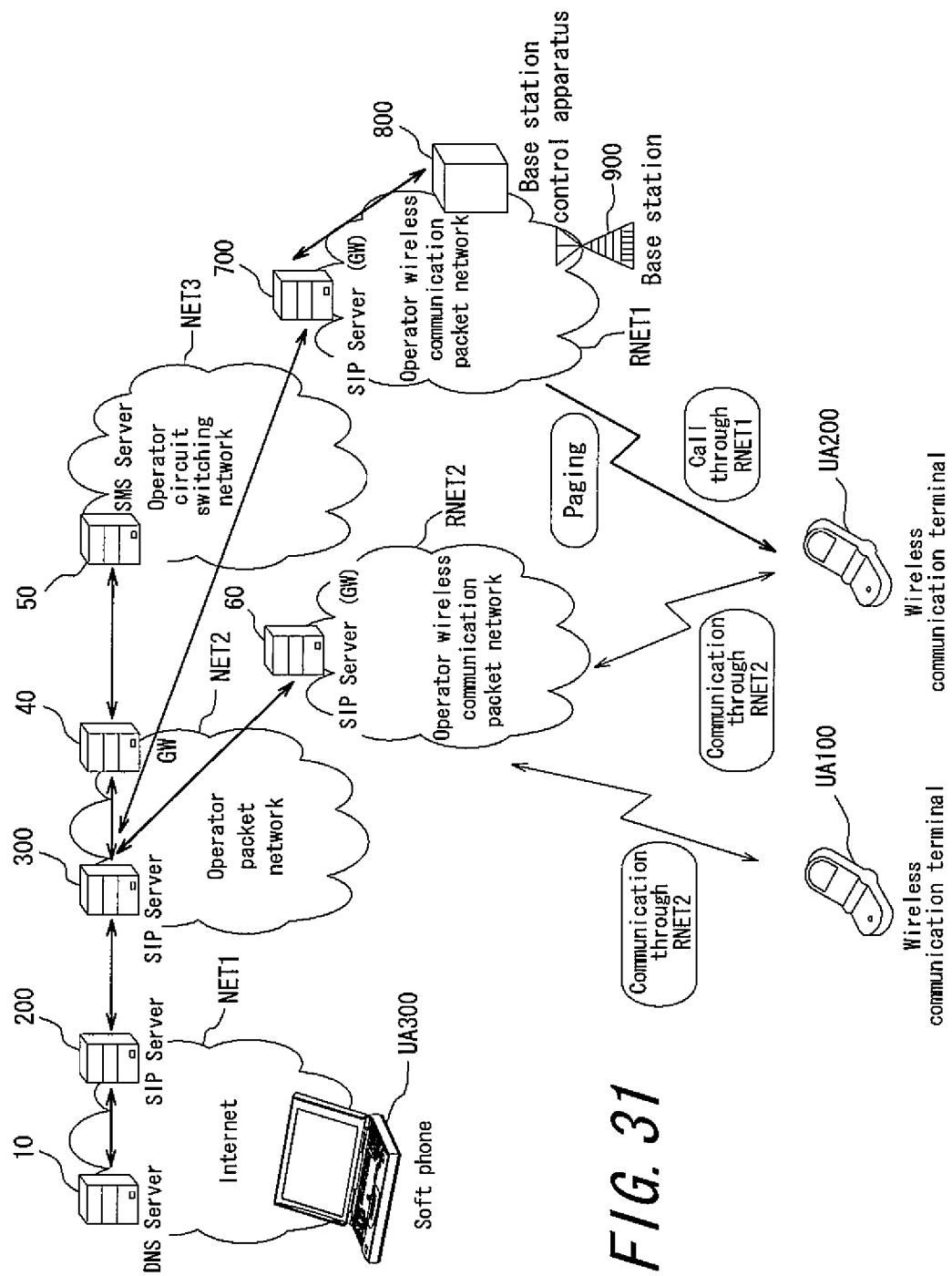
FIG. 31 is a wireless communication network block diagram in accordance with an embodiment of the present invention.

Next, as embodiment 4, a configuration using a paging for calling the corresponding party is described. FIG. 31 is a wireless communication network block diagram in accordance with an embodiment of the present invention. As shown in the figure, as servers and a gateways, there are a DNS server 10, a SIP server 200, a SIP server 300, a gateway (GW)40, an SMS server 50, a SIP server (or GW)60 and a SIP server (or GW)700. The SIP servers 200 and 300 serve as a call control server in accordance with the present invention, and the SIP server 700 (or a base station control apparatus 800, a base station 900) serves as a message transmission server in accordance with the present invention. As communication terminals and soft phones on the outgoing call side and the incoming call side, there are a wireless communication terminal UA (User Agent)100, a UA200 and a communication terminal (soft phone) UA300. Each of these terminals is connected to the above-mentioned each server and GW through an Internet NET1, an operator packet network NET2, an operator circuit switching network NET3 and an operator wireless communication packet networks RNET1 and RNET2.

The wireless communication terminal UA100 is connected to the operator wireless communication packet network RNET2. On the other hand, the wireless communication terminal UA200 waits on the operator wireless communication packet network RNET1. The operator wireless communication packet network RNET2 is a broader bandwidth network compared to the operator wireless communication packet network RNET1. The wireless communication terminal UA200 is a so-called multimode terminal that can be connected to a plurality of wireless communication networks. Here, for simplicity, it is assumed that the wireless communication terminal UA200 can be connected to the operator wireless communication packet network RNET1 and the operator wireless communication packet network RNET2. When the wireless communication terminal UA200 waits on the operator wireless communication packet network RNET1, it is not connected to a packet switching network of the operator wireless communication packet network RNET2 and is in an unconnected state (although an unconnected state is not necessarily required, here, an explanation is given on the above-mentioned conditions).

Here, in the case where the wireless communication terminal UA100 as an outgoing call/caller side (Calling Party) performs call of a real-time application service to the wireless communication terminal UA200 as an incoming call/callee side, the wireless communication terminal UA100 stores a preference for executing the real-time application by the wireless communication terminal UA200 in INVITE (connection initiation request) message of SIP and conveys it to the wireless communication terminal UA200. The contents of the preference are the same as those of embodiment 3.

There are the following two kinds of methods to convey such preference to the wireless communication terminal UA200.

The first method is to define a new header and a parameter to SIP in order for the wireless communication terminal UA200 to convey a preference (selection criteria) for selecting one wireless communication network from a plurality of wireless communication networks and connecting it by using SIP.

The second method is to notify the wireless communication terminal UA200 of the bandwidth specific to the application by using SDP (Session Description Protocol) of INVITE, and the wireless communication terminal UA200 selects the most suitable wireless communication network that meets the notified necessary bandwidth. In either case, a preference of the wireless communication terminal UA100 is notified by using SIP, and the SIP server of the operator of the wireless communication terminal UA200 includes the notified preference in the call request reception information and notifies the SIP server or a base station control apparatus or the like served as a paging control apparatus of it. The SIP server further includes the preference in a paging message and controls the subordinate base station control apparatus 800 and base station 900 so that notification is given to the wireless communication terminal UA200 through paging. Thus the wireless communication terminal UA200 can know the preference of the wireless communication terminal UA100. After that, the wireless communication terminal UA200 selects the most suitable wireless communication network based on the notified preference and connects to it, then after that, performs registration in the SIP server through the selected and connected most suitable wireless communication network.

Figure 32:
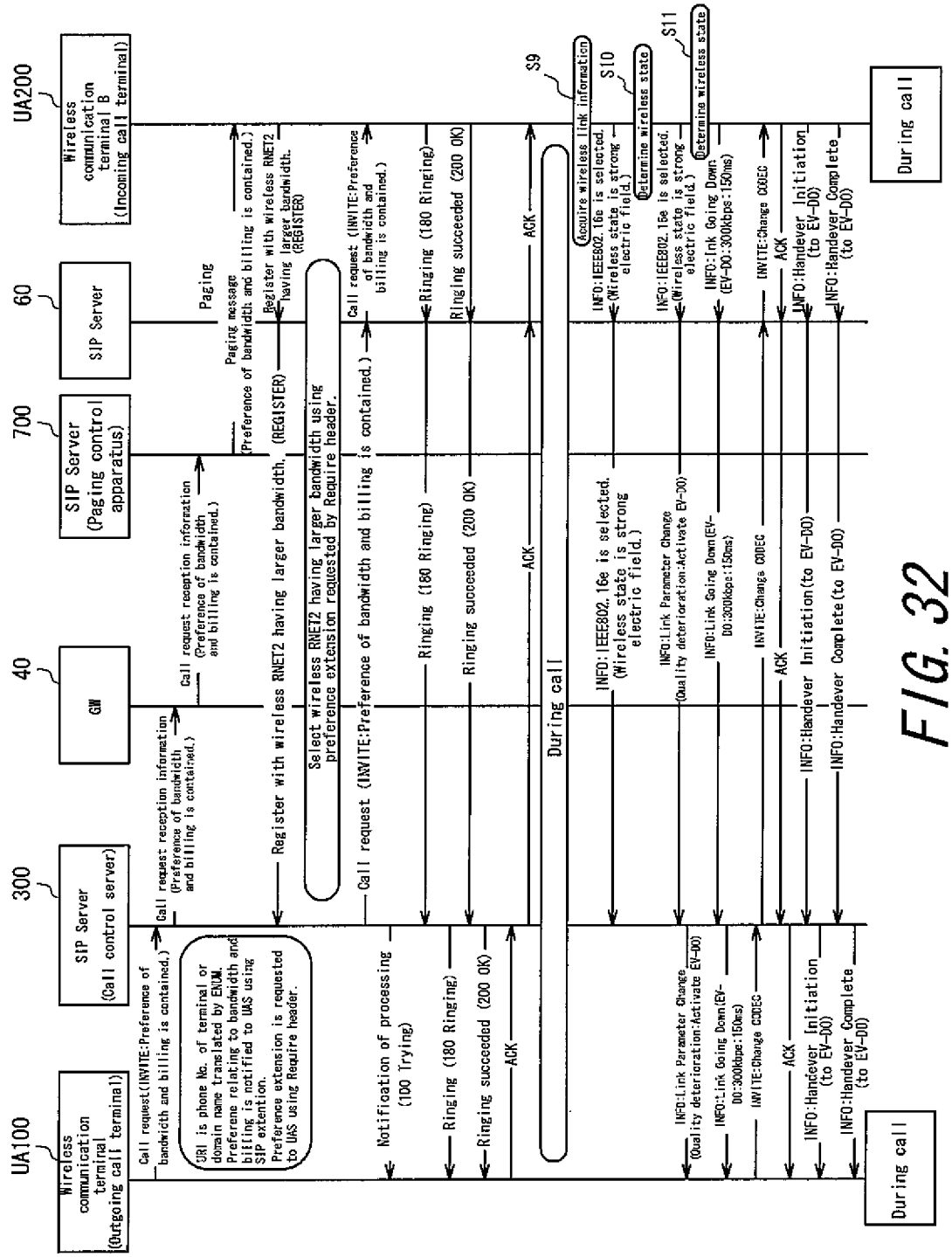
FIG. 32 is a sequence diagram in the case where communications are performed using wireless communication terminals subscribed to the same operator (wireless communication carrier)
Figure 33:
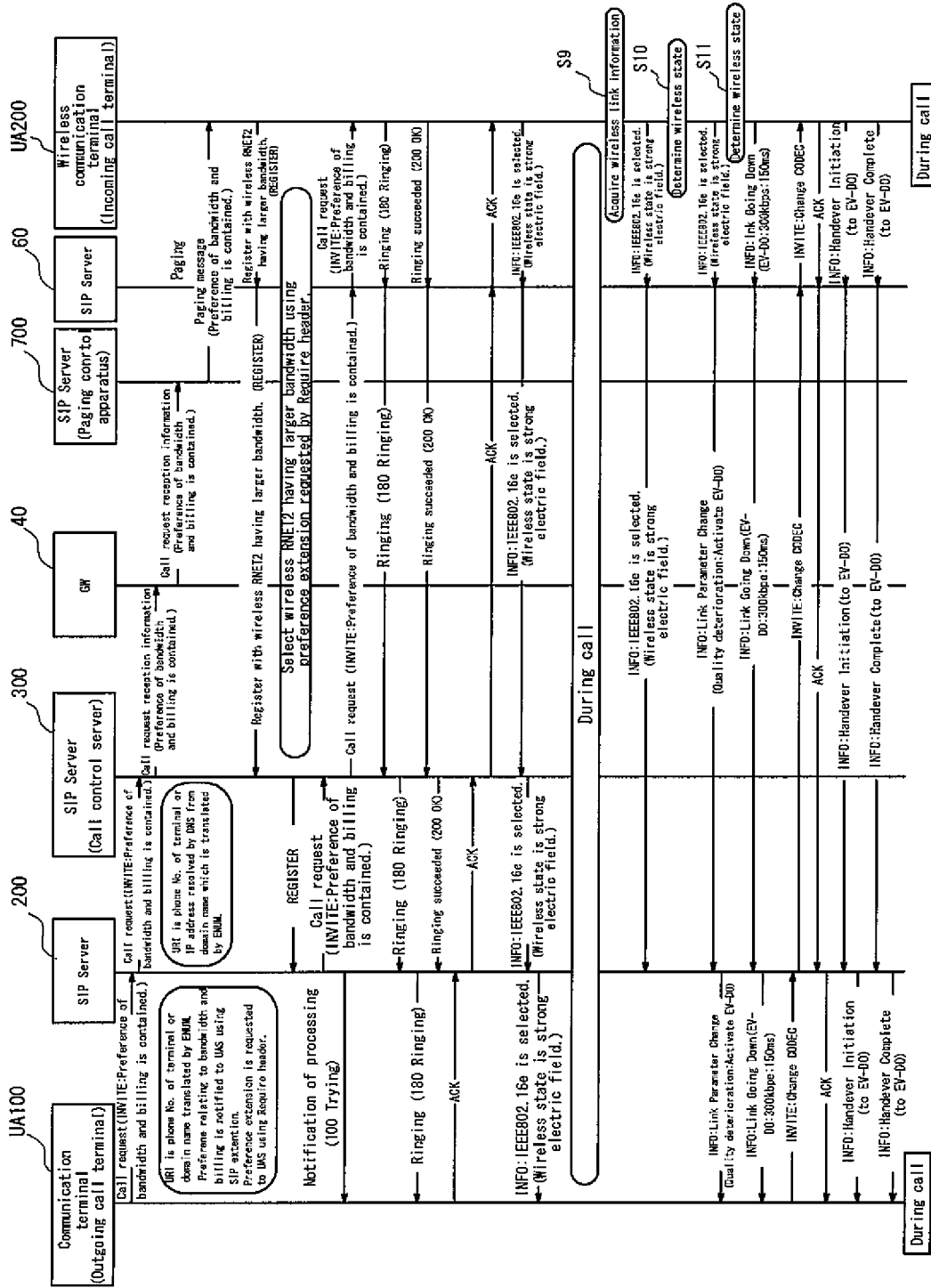
FIG. 33 is a sequence diagram in the case where communications are performed using terminals subscribed to different ISPs (Internet Service Providers).

FIG. 32 is a sequence diagrams in the case where communications are performed using wireless communication terminals subscribed to the same operator (wireless communication carrier). FIG. 33 is a sequence diagrams in the case where communications are performed using terminals subscribed to different ISPs (Internet Service Providers). FIG. 32 shows the case where a preference relating to bandwidth and billing (a preference relating to selection of a wireless communication network of the wireless communication terminal UA200) is conveyed by using the SIP extension when the wireless communication terminal UA100 transmits INVITE to the wireless communication terminal UA200 after registration in the SIP server 300. In this embodiment, a description example shown in embodiment 1 (FIG. 10) can be used as INVITE message. INVITE transmitted from the wireless communication terminal UA100 is notified by the registered SIP server 300 to the SIP server 700 through the GW40 of the operator as the call request information containing a preference relating to bandwidth and billing. The SIP server 700 controls the subordinate base station control apparatus 800 and base station 900 so that the notified preference is contained in a paging message and the paging message is transmitted to the wireless communication terminal UA200. The wireless communication terminal UA200 performs, based on the content of the preference notified by the paging message, registration in the SIP server 60 through the most suitable wireless communication network. In the case of FIGS. 32 and 33, priority is given to bandwidth and registration is performed by the operator wireless communication packet network RNET2 having a larger bandwidth.

After that, a session (communication) is established between the wireless communication terminal UA100 and the wireless communication terminal UA200 in accordance with the SIP procedures, then the wireless communication terminal UA200 on the incoming call side notifies the wireless communication terminal UA100 on the outgoing call side of the name of selected wireless communication network and its wireless state (radio wave strength) by using the INFO message extension. In this embodiment, the description example shown in embodiment 1 (FIG. 11) can be used as INFO message.

FIG. 33 is a sequence diagram showing the case where the wireless communication terminal UA200 performs communication with a terminal that uses an ISP which is different from that used by the wireless communication terminal UA200. In this case also, as in the case of FIG. 22, by using the SIP extension, a preference relating to bandwidth and billing is notified to the SIP server 200 of ISP (operator) of the wireless communication terminal UA200 through INVITE. INVITE containing the preference information is processed by redirecting from the SIP server 200 to the SIP server 300. In other words, in the present configuration, the SIP server 200 behaves as a conventional SIP server, and the SIP server 300 serves as a call control server that supports a new SIP format in accordance with the present invention. The following sequence is the same as that of FIG. 32.

FIG. 24 that is mentioned earlier shows that, in the case where the wireless communication terminal UA200 can be connected to a circuit switching network, the wireless communication terminal UA200, at first, conveys a preference of the outgoing call side to the wireless communication terminal UA200 by using the SIP extension and SMS, and establishes a session using the wireless communication network RNET2 (802.16e) that meets the preference, then after that, notifies the wireless communication terminal UA100, which is the corresponding party, of the L2 information that is abstracted associated with deterioration of communication quality at the wireless communication network RNET2 and accordingly, the application can correspond to the handover to the wireless communication network RNET1.

In FIG. 32, right after communication is initiated, in step S9, the wireless communication terminal UA200, which is an incoming call terminal, acquires a radio state (RSSI) as the wireless link information, stores the acquired information and the selected wireless communication scheme (in this case, the wireless state of strong field and IEEE802.16e are selected) in INFO message and transmits it to the wireless communication terminal UA100, which is an outgoing call terminal. After that, during call, the wireless communication terminal UA200 may monitor the wireless state periodically and transmit the monitoring result (the wireless link information) to the wireless communication terminal UA100. Then, when it is determined that the periodically monitored wireless state has been deteriorated (equal to or below the quality level 1) (step S10), the wireless communication terminal UA200 activates the wireless communication network RNET1 (EV-DO), which is another wireless communication network, and establishes a wireless link. At that time, the wireless communication terminal UA200 notifies the wireless communication terminal UA100, which is the corresponding party, of the L2 information event (the wireless link information) of "Link_Parameter_Change" through INFO message by using the SIP extension at the same time. Thus initiation of preparation for handover by the wireless communication terminal UA200 from the wireless communication network RNET2 to the wireless communication network RNET1 is notified to the application for the wireless communication terminal UA100. After that, in step S11, when the communication quality of the wireless communication terminal UA200 in the wireless communication network RNET2 is further deteriorated and becomes equal to or below the quality level 2, the wireless communication terminal UA200 notifies the application for the wireless communication terminal UA100, which is an outgoing call terminal, of the L2 information event (the wireless link information) of "Link_Going_Down" containing the average delay time (150 ms), jitter, expected bandwidth (300 kbps) or the like of the handover destination by using the SIP extension in the same manner.

Here, the wireless communication terminal UA100 learns that the wireless communication network RNET1 of the handover destination is a network whose bandwidth is narrower than that of the wireless communication network RNET2 that is currently used by the wireless communication terminal UA200 and queries (codec change request) the wireless communication terminal UA200 through INVITE in order for the application to change to the codec for a narrower bandwidth suitable for the notified bandwidth and delay characteristics (in this case, application is VoIP) beforehand. The wireless communication terminal UA200 notifies the application for the wireless communication terminal UA100 of acknowledgement of the notification of codec change by "ACK" (acknowledgement). In response to this, the wireless communication terminals UA100 and UA200 change codec (or change of codec rate and setting values for codec processing) at the same time. FIG. 33 is a sequence diagram in the case where communication is performed by terminals subscribed to different ISPs (Internet Service Providers). However, the various pieces of wireless link information is conveyed to the wireless communication terminal UA100 on the caller side triggered by steps S12, S13 and S14 that are the same process as steps S9~11 of FIG. 32. In this manner, the wireless communication terminal not only uses the abstract L2 information (the wireless information) that is not dependent on the wireless communication media defined by the IEEE 802.21 or the like in the terminal, but also notifies the wireless communication terminal, which is the corresponding party, or the application or the control unit of the multimedia terminal on the Internet of the abstract L2 information. Thus it is possible to precisely adapt the application to the handover between different kinds of media.

Further, it is possible to adopt a configuration that does not use the SIP extension (for example, SDP is used) also in embodiment 4. However, since it is the same as embodiment 3, drawings and explanations are omitted.

The SIP server (call control server) 700 used by embodiments 3 and 4 has the same components and functions as those of embodiment 1 shown in FIG. 20.

According to embodiments 3 and 4, in the case where the wireless communication terminal on the incoming call side has a plurality of wireless communication systems (wireless communication device/path/network) as options, it is possible to convey the wireless link information of the wireless communication system selected on the incoming call side to the outgoing call side. This conveyance of wireless link information enables the outgoing call side to grasp which wireless communication system (network or the like) has been selected, what kind of attribute the selected wireless communication system (network) has, and which state the wireless link is in. This also expedites, when communication has a problem, problem determination such as whether the problem is caused by the network on the corresponding party side or not. In addition, on the side where the wireless link information is received (outgoing call side), it is possible to learn easily the cause of deterioration of the communication quality caused by the wireless communication network on the corresponding party side, or the like.

Advantages of the above-mentioned embodiments 3 and 4 are shown below. In the case where handover to another wireless communication network is performed by a multimode terminal due to deterioration of communication quality during communication, following notifications are made to the corresponding party;

possibility of switching of wireless network: event that the wireless network under communication becomes unavailable soon;

preparation for handover: promoting preparation for handover to another wireless communication network;

the wireless link information of handover destination: bandwidth and delay characteristics that can be supplied by the wireless communication network of the handover destination;

event of initiation of wireless network switching: event that handover to another wireless communication network has been initiated; and completion of switching of wireless network: event that handover to another wireless communication network has been completed.

By notifying an application or a control unit of the corresponding party of the above mentioned information by using SIP, the application of the corresponding party can change the parameters (type of codec, codec scheme, codec rate, frame rate, buffer size or the like) of the application to the appropriate values at the appropriate timing to correspond to handover. Thus the application quality can be maintained.

In addition, at the time of handover, the user can select among
change of application;
change of parameters (type of codec, codec scheme, codec rate, frame rate, buffer size or the like) to the appropriate values to correspond to handover; and
no change.

Moreover, in a multimode terminal, by exchanging the abstract L2 information between a wireless link layer and a control unit, latency of handover can be shortened without being dependent on a wireless communication network and unnecessary battery consumption can be saved.

The present invention has been described based on the various drawings and embodiments. However, it should be noted that those skilled in the art can make various changes and modifications easily based on this disclosure. Therefore, it should be noted that these changes and modifications fall within the scope of the present invention. For example, functions or the like contained in each unit and each step can be rearranged without causing logical inconsistencies, and it is possible to combine a plurality of units and steps or to divide one unit or step. In the embodiments, explanations were given by taking "communication" as an example of session. However, the present invention is not limited to communications and is applicable to real-time applications such as communications like streaming chat.

The present invention has been described based on the various drawings and embodiments. However, it should be noted that those skilled in the art can make various changes and modifications easily based on this disclosure. Therefore, it should be noted that these changes and modifications fall within the scope of the present invention. For example, functions or the like contained in each unit and each step can be rearranged without causing logical inconsistencies, and it is possible to combine a plurality of units and steps or to divide one unit or step.

The invention claimed is:

1. A communication system comprising: a call control server for packet communication and a message transmission server;

wherein the call control server further comprises: a call request reception unit for receiving a call request containing communication connection path preference information of an outgoing call side and for calling an incoming call side, wherein the communication connection path preference information including at least one of bandwidth related information relating to bandwidth of a communication line used by the communication and billing related information relating to billing for the communication, wherein the communication connection path preference information is used for selecting one wireless communication system among a plurality of wireless communication systems; and a call request transmission unit for transmitting call request reception information that contains information indicating that the call request has been received and the communication connection path preference information contained in the call request to the message transmission server in order to convey the received call request to the incoming call side, and the message transmission server comprises:

an information reception unit for receiving the call request reception information transmitted from the call control server; and an activation message transmission unit for transmitting an activation message for activating process of login to the call control server for packet communication by containing the communication connection path preference information contained in the call request reception information, based on the received call request reception information, to the incoming call side via a circuit switching network.

2. The communication system according to claim 1, wherein
the communication system further comprises a wireless communication terminal as the incoming call side capable of being connected to a plurality of wireless communication systems, and
the wireless communication terminal comprises:
a reception unit for receiving the activation message containing the communication connection path preference information transmitted from the message transmission server; and
a control unit for controlling to select one wireless communication system among the plurality of wireless communication systems based on the communication connection path preference information of the outgoing call side contained in the received activation message, connect to the selected one wireless communication system and perform process of login to the call control server through the connected wireless communication system.

3. A wireless communication terminal capable of being connected to a plurality of wireless communication systems, comprising:
a reception unit for receiving an activation message containing communication connection path preference information of an outgoing call side and for activating process of login to a call control server for packet communication from a message transmission server via a circuit switching network, wherein the communication connection path preference information including at least one of bandwidth related information relating to bandwidth of a communication line used by the communication and billing related information relating to billing for the communication; and
a control unit for controlling to select one wireless communication system among the plurality of wireless communication systems based on the communication connection path preference information of the outgoing call side contained in the received activation message, connect to the selected one wireless communication system and perform process of login to the call control server through the connected wireless communication system.

4. The wireless communication terminal according to claim 3, further comprising a transmission unit for transmitting radio state information indicating a radio state of wireless communication in the connected wireless communication system to the outgoing call side.

5. The wireless communication terminal according to claim 3, wherein
the reception unit receives the radio state information, transmitted from an incoming call side, indicating the radio state of the wireless communication of the wireless communication system to which the incoming call side is connected, and
the wireless communication terminal further comprises a display unit for displaying the received radio state information.

6. A communication method using a call control server for packet communication and a message transmission server, the method comprising the steps of:
receiving, by the call control server, a call request containing communication connection path preference information of an outgoing call side and for calling an incoming call side, wherein the communication connection path preference information including at least one of bandwidth related information relating to bandwidth of a communication line used by the communication and billing related information relating to billing for the communication; and
transmitting, by the call control server, call request reception information that contains information indicating that the call request has been received and the communication connection path preference information contained in the call request to the message transmission server in order to convey the received call request to the incoming call side, and
the message transmission server comprising the steps of:
receiving the call request reception information transmitted from the call control server; and
transmitting an activation message for activating process of login to the call control server for packet communication by containing the communication connection path preference information contained in the call request reception information, based on the received call request reception information, to the incoming call side via a circuit switching network; and
using the communication connection path preference information to select one wireless communication system from among a plurality of wireless communication systems.

7. A wireless communication method of a wireless communication terminal capable of being connected to a plurality of wireless communication systems, comprising the steps of:
receiving an activation message containing communication connection path preference information of an outgoing call side and for activating process of login to a call control server for packet communication from a message transmission server via a circuit switching network, wherein the communication connection path preference information including at least one of bandwidth related information relating to bandwidth of a communication line used by the communication and billing related information relating to billing for the communication; and
controlling to select one wireless communication system among the plurality of wireless communication systems based on the communication connection path preference information of the outgoing call side contained in the received activation message, connect to the selected one wireless communication system and perform process of login to the call control server through the connected wireless communication system.

8. A communication system comprising:
a call control server for packet communication and a paging control apparatus for processing a paging message transmitted to a wireless communication system;
wherein the call control server further comprises:
a call request reception unit for receiving a call request containing communication connection path preference information of an outgoing call side and for calling an incoming call side, wherein the communication connection path preference information including at least one of bandwidth related information relating to bandwidth of a communication line used by the communication and billing related information relating to billing for the communication; and
a call request transmission unit for transmitting call request reception information that contains information indicating that the call request has been received and the communication connection path preference information contained in the call request to the paging control apparatus in order to convey the received call request to the incoming call side, and the paging control apparatus comprises:

an information reception unit for receiving the call request reception information transmitted from the call control server; and a paging message transmission control unit for controlling to transmit a paging message for calling the incoming call side and conveying an incoming call to the incoming call side with containing the communication connection path preference information contained in the call request reception information, based on the received call request reception information, to the wireless communication system, wherein a wireless communication system different from a wireless communication system used for transmission of the paging message can be selected based on the communication connection path preference information.

9. The communication system according to claim 8, wherein the communication system further comprises a wireless communication terminal as the incoming call side capable of being connected to a plurality of wireless communication systems, and the wireless communication terminal comprises:

a reception unit for receiving the paging message containing the communication connection path preference information transmitted from the paging control apparatus; and a control unit for controlling to select one wireless communication system among the plurality of wireless communication systems based on the communication connection path preference information of the outgoing call side contained in the received paging message, connect to the selected one wireless communication system and perform process of login to the call control server through the connected wireless communication system.

10. A wireless communication terminal capable of being connected to a plurality of wireless communication systems, comprising:

a reception unit for receiving a paging message for calling the terminal from a wireless communication system under a standby status among the plurality of wireless communication systems and informing an incoming call to the terminal; and a control unit for controlling to select one wireless communication system among the plurality of wireless communication systems based on communication connection path preference information of the outgoing call side contained in the received paging message, connect to the selected one wireless communication system and perform process of login to a call control server through the connected wireless communication system, wherein the communication connection path preference information including at least one of bandwidth related information relating to bandwidth of a communication line used by the communication and billing related information relating to billing for the communication, wherein a wireless communication system different from a wireless communication system used for transmission of the paging message can be selected based on the communication connection path preference information.

11. The wireless communication terminal according to claim 10, further comprising a transmission unit for transmitting radio state information indicating a radio state of wireless communication in the connected wireless communication system to the outgoing call side.

12. The wireless communication terminal according to claim 10, wherein the reception unit receives the radio state information, transmitted from a corresponding party, indicating the radio state of the wireless communication in the wireless communication system to which the corresponding party is connected, and the wireless communication terminal further comprises a display unit for displaying the received radio state information.

13. A communication method using a call control server for packet communication and a paging control apparatus for processing a paging message transmitted to a wireless communication system, the method comprising the steps of:

receiving, by the call control server, a call request containing communication connection path preference information of an outgoing call side and for calling an incoming call side, wherein the communication connection path preference information including at least one of bandwidth related information relating to bandwidth of a communication line used by the communication and billing related information relating to billing for the communication; and transmitting, by the call control server, call request reception information that contains information indicating that the call request has been received and the communication connection path preference information contained in the call request to the paging control apparatus in order to convey the received call request to the incoming call side, and the paging control apparatus comprising the steps of:

receiving the call request reception information transmitted from the call control server; and controlling to transmit a paging message for calling the incoming call side and conveying an incoming call to the incoming call side by containing the communication connection path preference information contained in the call request reception information, based on the received call request reception information, to the wireless communication system, wherein a wireless communication system different from a wireless communication system used for transmission of the paging message can be selected based on the communication connection path preference information.

14. A wireless communication method of a wireless communication terminal capable of being connected to a plurality of wireless communication systems, comprising the steps of:

receiving a paging message for calling the terminal from a wireless communication system under a standby status among the plurality of wireless communication systems and informing an incoming call to the terminal; and controlling to select one wireless communication system among the plurality of wireless communication systems based on communication connection path preference information of the outgoing call side contained in the received paging message, connect to the selected one wireless communication system and perform process of login to a call control server through the connected wireless communication system, wherein the communication connection path preference information including at least one of bandwidth related information relating to bandwidth of a communication line used by the communication and billing related information relating to billing for the communication, wherein a wireless communication system different from a wireless communication system used for transmission of the paging message can be selected based on the communication connection path preference information.

\* \* \* \* \*